United States Patent
McDeed et al.

(10) Patent No.: US 11,635,003 B2
(45) Date of Patent: Apr. 25, 2023

(54) DIVERSION SYSTEMS FOR LOW EMISSION START CONVERTER

(71) Applicant: Mitsubishi Power Americas, Inc., Lake Mary, FL (US)

(72) Inventors: David McDeed, Altamonte Springs, FL (US); Maria Kacer, Warren, NJ (US); Eric J. Albrecht, Wethersfield, CT (US); David Hunt, DeLand, FL (US)

(73) Assignee: Mitsubishi Power Americas, Inc., Lake Mary, FL (US)

( * ) Notice: Subject to any disclaimer, the term of this patent is extended or adjusted under 35 U.S.C. 154(b) by 0 days.

(21) Appl. No.: 17/494,179

(22) Filed: Oct. 5, 2021

(65) Prior Publication Data

US 2022/0025785 A1    Jan. 27, 2022

Related U.S. Application Data

(63) Continuation of application No. 16/148,544, filed on Oct. 1, 2018, now Pat. No. 11,168,588.

(51) Int. Cl.
| | | |
|---|---|---|
| *F01D 25/30* | (2006.01) | |
| *F01K 23/10* | (2006.01) | |
| *F02C 6/18* | (2006.01) | |

(52) U.S. Cl.
CPC .......... *F01D 25/30* (2013.01); *F01D 25/305* (2013.01); *F01K 23/10* (2013.01); *F02C 6/18* (2013.01); *F05D 2220/32* (2013.01); *F05D 2220/72* (2013.01); *F05D 2270/08* (2013.01); *F05D 2270/082* (2013.01)

(58) Field of Classification Search
CPC ........ F01D 25/30; F01D 25/305; F01K 23/10; F01N 13/0097; F02C 6/18; F05D 2260/606; F05D 2270/08; F05D 2270/082
See application file for complete search history.

(56) References Cited

U.S. PATENT DOCUMENTS

| | | |
|---|---|---|
| 9,399,927 B2 | 7/2016 | Mcdeed et al. |
| 11,168,588 B2 | 11/2021 | Mcdeed et al. |
| 2002/0011065 A1 | 1/2002 | Nishimura et al. |

(Continued)

FOREIGN PATENT DOCUMENTS

| | | | | |
|---|---|---|---|---|
| CN | 102658025 A | * | 9/2012 | ............. B01D 53/90 |
| JP | 2004218952 A | * | 8/2004 | ............. F01K 23/10 |

OTHER PUBLICATIONS

English translation of CN102658025A. (Year: 2012).*

(Continued)

*Primary Examiner* — Scott J Walthour
(74) *Attorney, Agent, or Firm* — Schwegman Lundberg & Woessner, P.A.

(57) ABSTRACT

An emission reduction system for a combined cycle power plant including a gas turbine and heat recovery steam generator (HRSG) can comprise a stationary emission converter in fluid communication with and disposed upstream of the HRSG, and a diversion system operably coupled to an exhaust passage of the gas turbine, the exhaust passage defining an exhaust path for exhaust gas of the gas turbine through the heat recovery steam generator, the diversion system operable to define a primary exhaust path excluding the stationary emission converter and a start-up exhaust path including the stationary emission converter.

20 Claims, 13 Drawing Sheets

(56) References Cited

U.S. PATENT DOCUMENTS

| 2005/0268594 | A1 | 12/2005 | Kurihara et al. |
| 2014/0010748 | A1* | 1/2014 | Kim ................. F23J 15/003 423/239.1 |
| 2014/0360154 | A1 | 12/2014 | Benz et al. |
| 2018/0238211 | A1 | 8/2018 | Kulkarni et al. |
| 2018/0238213 | A1 | 8/2018 | Kulkarni et al. |
| 2020/0102856 | A1 | 4/2020 | Mcdeed et al. |

OTHER PUBLICATIONS

"U.S. Appl. No. 16/148,544, Examiner Interview Summary dated Jun. 11, 2021", 2 pgs.

"U.S. Appl. No. 16/148,544, Final Office Action dated Apr. 16, 2021", 19 pgs.

"U.S. Appl. No. 16/148,544, Non Final Office Action dated Oct. 26, 2020", 13 pgs.

"U.S. Appl. No. 16/148,544, Notice of Allowance dated Jul. 9, 2021", 11 pgs.

"U.S. Appl. No. 16/148,544, Response filed Jan. 26, 2021 to Non Final Office Action dated Oct. 26, 2020", 16 pgs.

"U.S. Appl. No. 16/148,544, Response filed Jun. 5, 2020 to Restriction Requirement dated Apr. 15, 2020", 8 pgs.

"U.S. Appl. No. 16/148,544, Response filed Jun. 17, 2021 to Final Office Action dated Apr. 16, 2021", 15 pqs.

"U.S. Appl. No. 16/148,544, Restriction Requirement dated Apr. 15, 2020", 8 pgs.

U.S. Appl. No. 16/148,544, filed Oct. 1, 2018, Diversion Systems for Low Emission Start Converter.

\* cited by examiner

DIVERSION SYSTEMS FOR LOW EMISSION START CONVERTER

TECHNICAL FIELD

The present disclosure relates generally to power plants, such as combined cycle power plants. More particularly, the present disclosure relates to systems and methods for reducing start-up emissions in a power plant including a gas turbine engine and a downstream heat sink.

BACKGROUND

Combined cycle power plants can employ a gas turbine system and a steam turbine system to generate power. In order to be permitted by various governmental agencies, power plant operators can be required by environmental regulations to meet emissions limits over the full operational range of the combined cycle power plant. Environmental regulations can limit the amounts of nitrogen dioxide (NOx) and/or carbon monoxide (CO) emitted by the gas turbine system during low load operations such as during start-up of the power plant and during full load operations such as during peak energy demand situations.

In order to comply with these environmental regulations and other considerations, combined cycle power plants can incorporate various emissions control systems. Gas turbine emissions can be typically controlled by two systems that chemically interact with exhaust gas of a gas turbine system. First, the exhaust gas can be passed through a CO catalyst system to oxidize CO from the exhaust gas into carbon dioxide (CO2), as well as oxidizing volatile organic compounds (VOCs). Second, a selective catalytic reduction (SCR) system can convert NOx in the exhaust gas to nitrogen and water by causing the exhaust gas to react with a reducing agent, such as anhydrous ammonia, aqueous ammonia or urea. However, during low load conditions of a combined cycle power plant, for example, the SCR system and the CO catalyst system may not be active because they may not attain the operating temperature of the emission controls systems. Furthermore, even when operating at high load conditions, it can take an amount of time before the emission control systems heat up to the operating temperature. These situations can arise because the emission control systems are typically located after various heat exchanger elements within a heat recovery steam generator (HRSG), such as a superheater within the HRSG or a high pressure (HP) drum, which can act as a heat sink inhibiting warming of the emissions control systems. For example, from start-up it can take more than 30 minutes for traditional emission control systems to reach sufficient operating temperatures to start reducing NOx and CO emissions. In such a scenario, exhaust gas can exit to atmosphere from the HRSG without adequate or any emission reductions. As such, the power plant can emit undesirably high levels of NOx and/or CO emissions during the start-up procedure. These high levels of emissions are typically counted against limits under government issued permits, which can have different limits for start-ups, high load operations and overall yearly operation. Unduly high start-up emissions can therefore require later offsetting by more efficient operation at high load conditions, which in and of itself introduces new operating constraints and costs.

In order to address CO emissions, additional CO catalysts have been positioned upstream of a superheater, but such structure places further limitations on the power plant during full load operation. In another approach, the load of the gas turbine system is quickly raised from startup to a point where emissions are lower, which can be referred to as a 'rapid response' start-up. However, this approach adds more equipment and complex control systems to the power plant.

Examples of emission control systems in gas turbine systems are described in U.S. Pat. No. 9,399,927 to McDeed et al. and U.S. Pub. No. 2018/0238211 to Kulkarni et al.

OVERVIEW

The present inventors have recognized, among other things, that a problem to be solved can include reducing emissions during start-up procedures of gas turbine engines and systems used in combined cycle power plants. The present inventors have recognized that existing systems and methods for reducing emissions at start-up introduce mechanical, operational and safety issues that can outweigh any benefits of reduced emissions at start-up. For example, the present inventors have recognized that proposed systems for selectively inserting emission converters into the exhaust gas stream of the gas turbine during start-up and then withdrawing the emission converters during high load operations can introduce overly complex insertion and withdrawal mechanisms that are difficult to seal, thereby producing leakage problems that potentially produce emissions and safety issues, as is discussed in greater detail below. As used herein, "emission converter" indicates all or part of any form of exhaust toxin removing or reducing system, including without limitation, catalyst structures. The emission converter can remove different forms of toxins and take on a variety of structural forms.

The present subject matter can help provide a solution to this problem, such as by providing diversion systems that can selectively re-route exhaust gas flow from a gas turbine engine or system primary exhaust duct through a start-up duct to engage a start-up emission converter. The diversion system can be positioned upstream of a heat recovery steam generator (HRSG) to facilitate the start-up emission converter rapidly achieving operating temperatures. After the HRSG has achieved operating temperatures sufficient to activate emission control units located therein, the diversion systems can be operated to route the exhaust gas flow through the primary exhaust duct without passing through the start-up duct. In such configurations, the start-up emission converter can remain stationary, thereby improving the ability to seal around the start-up emission converter and the start-up duct. Furthermore, ducting and actuations mechanisms for flow control elements, such as damper elements, used to control exhaust gas flow to the diversion systems can be simple and easy to implement and seal.

In an example, an emission reduction system for a combined cycle power plant including a gas turbine and heat recovery steam generator (HRSG) can comprise a stationary emission converter in fluid communication with and disposed upstream of the HRSG, and a diversion system operably coupled to an exhaust passage of the gas turbine, the exhaust passage defining an exhaust path for exhaust gas of the gas turbine through the heat recovery steam generator, the diversion system operable to define a primary exhaust path excluding the stationary emission converter and a start-up exhaust path including the stationary emission converter.

In another example, a method for controlling emissions during low load conditions of a gas turbine engine used in a combined cycle power plant can comprise starting the gas turbine engine that generates an exhaust gas flow, directing the exhaust gas flow of the gas turbine engine through a primary passage of an exhaust duct coupled to a heat recovery steam generator (HRSG), actuating a flow control element to close-off exhaust gas flow through the primary passage and route exhaust gas flow into a start-up passage of a start-up duct, directing the exhaust gas flow in the start-up passage through an emission converter located in the start-up duct, attaining an operation parameter of the combined cycle power plant; and actuating the flow control element to close-off exhaust gas flow through the start-up passage and route exhaust gas flow into the primary passage.

In an additional example, an emission reduction system for a power plant can comprise a gas turbine and a heat recovery steam generator (HRSG) having an exhaust duct for fluidly coupling a gas turbine and a heat recovery steam generator (HRSG), the exhaust duct defining a primary exhaust passage, a diversion system coupled to the exhaust duct and comprising a start-up duct defining a start-up passage bypassing a portion of the primary exhaust passage and a flow control element operatively coupled to the start-up duct to move between a first position and a second position, and a stationary emission converter disposed within the start-up duct, wherein the flow control element is configured to maintain exhaust gas flow through the primary exhaust passage and prevent exhaust gas flow through the start-up passage in a first position and divert exhaust gas flow from the primary exhaust passage through the start-up passage in a second position.

This overview is intended to provide an overview of subject matter of the present patent application. It is not intended to provide an exclusive or exhaustive explanation of the invention. The detailed description is included to provide further information about the present patent application.

Figure 1:
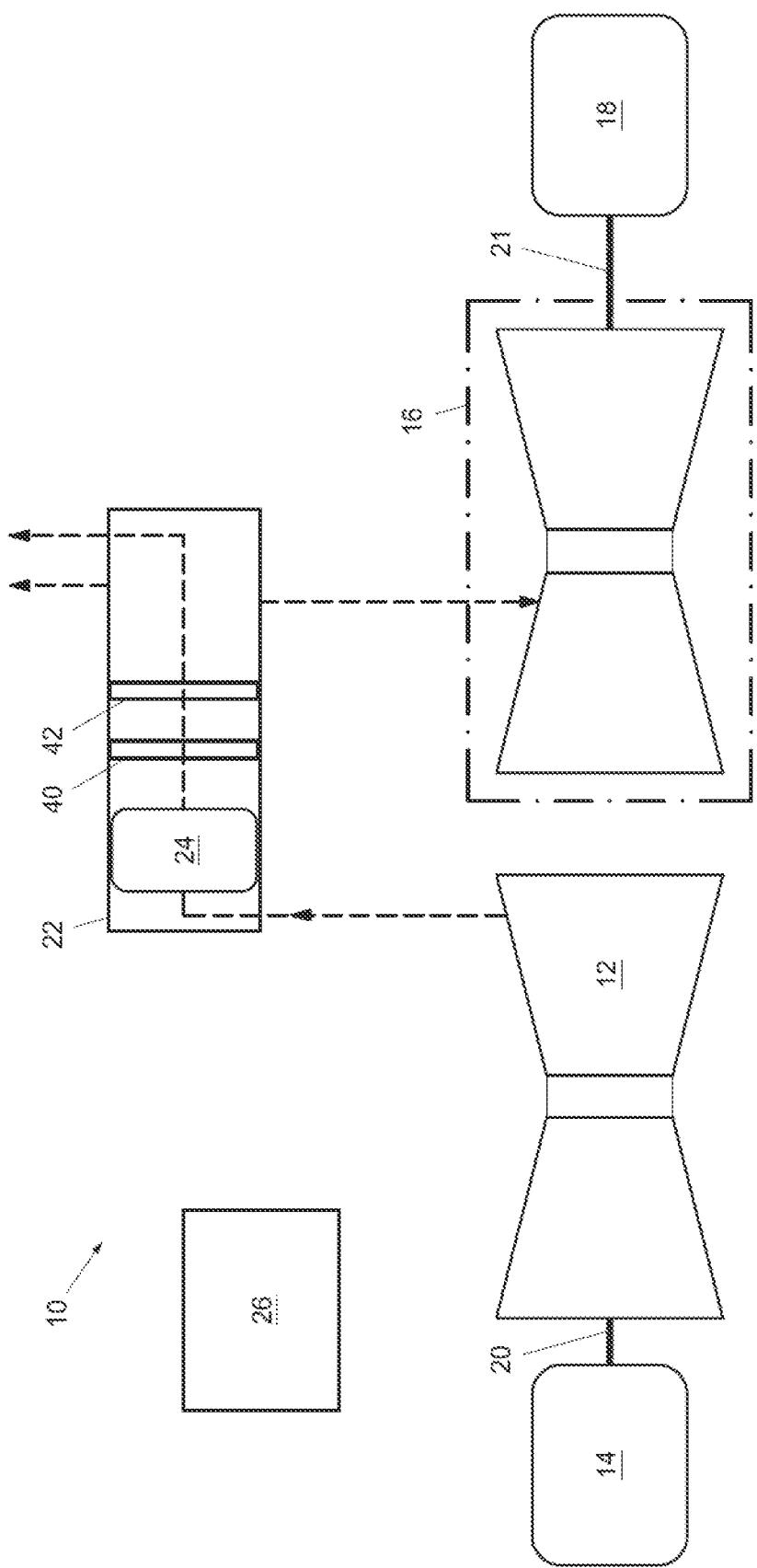
FIG. 1 is a schematic diagram of a conventional combined cycle power plant.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

FIG. 1 is a schematic diagram of combined cycle power plant 10 comprising gas turbine system 12, electric generator 14, steam turbine system 16 and electric generator 18. In the illustrated example, gas turbine system 12 comprises a multi-shaft system with two generators, but can have other configurations. Gas turbine system 12 can be operably coupled to generator 14 via shaft 20. Steam turbine system 16 can be operably coupled to generator 18 via shaft 21. Combined cycle power plant 10 can also include heat recovery steam generator (HRSG) 22, which can be operably connected to gas turbine system 12 and steam turbine system 16. HRSG 22 can be fluidly connected to both gas turbine system 12 and steam turbine system 16 via conventional conduits. HRSG 22 can include superheater 24, CO catalyst system 40 and selective catalytic reduction (SCR) system 42, but can have other configurations.

Figure 2:
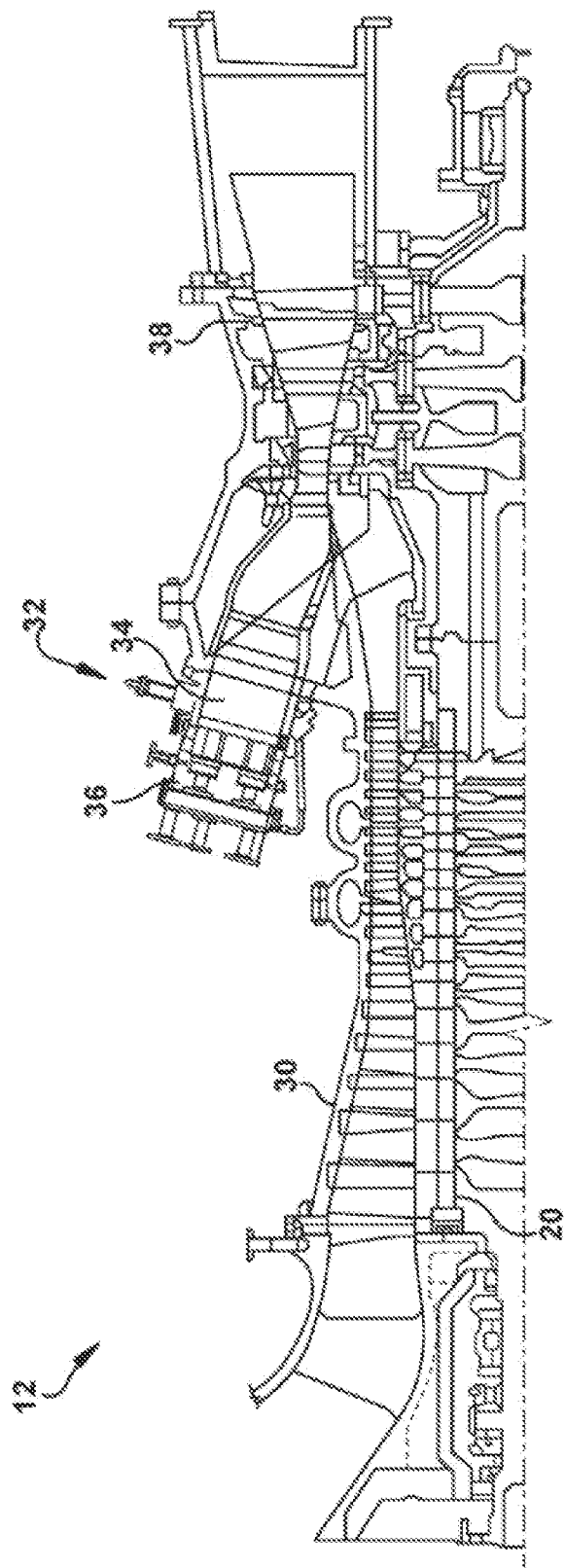
FIG. 2 is a cross-sectional view of a conventional gas turbine system.

FIG. 2 is a cross-sectional view of an embodiment of gas turbine system 12 of FIG. 1. Gas turbine system 12 can comprise compressor 30 and combustor 32. Combustor 32 can include combustion region 34 and fuel nozzle assembly 36. Gas turbine system 12 can also include gas turbine 38, which can be coupled to compressor 30 via common shaft 20. In operation, air can enter the inlet of compressor 30, can be compressed and then discharged to combustor 32 where fuel, such as a gas, e.g., natural gas, or a fluid, e.g., oil, is burned to provide high energy combustion gases that can drive gas turbine 38. In gas turbine 38, the energy of the hot gases is converted into work at shaft 20. Shaft 20 can be used to drive compressor 30 and other loads such as generator 14 to produce electricity.

Returning to FIG. 1, the energy in the exhaust gases (dashed line) exiting gas turbine system 12 can be converted into additional useful work in HRSG 22. The exhaust gases can enter HRSG 22, in which water can be converted to steam in the manner of a boiler for operation of steam turbine 16. Within HRSG 22, superheater 24 can be provided to superheat the steam using the exhaust and optionally another heat source prior to the steam entering steam turbine system 16, e.g., at a high pressure (HP) turbine thereof. Steam turbine system 16 can include one or more steam turbines, e.g., a high pressure (HP) turbine, an intermediate pressure (IP) turbine and a low pressure (LP) turbine, each of which can be coupled to shaft 21. Each steam turbine can include a plurality of rotating blades (not shown) mechanically coupled to shaft 21. In operation, steam from various parts of HRSG 22 can enter an inlet of at least one of the steam turbines, and can be channeled to impart a force on blades thereof causing shaft 21 to rotate. Steam from an upstream turbine may be employed later in a downstream turbine. Work can be extracted from steam turbine system 16 to drive shaft 21 and an additional load such as generator 18 to produce additional electric power. A conventional power plant control system 26 can control the above-described components.

Governmental agencies have required combined cycle power plants to meet environmental emissions limits over a large load range, which can produce challenges relating to gas turbine system operations. For example, environmental emissions limits can set maximum emissions for nitrogen dioxide (NOx) and carbon monoxide (CO) during low load operations such as during start-up of the system. In particular, during start-up of gas turbine system 12, a number of operational characteristics create relatively high NOx and/or CO emissions. In one example, gas turbine system exhaust may be at about 370° C. at start-up (approximately 5%-20% load) to allow HRSG warmup that accommodates traditional thermal stress mitigation, mating of steam temperature with an ideal for steam turbine system start, reheat pressure reduction for steam turbine system start (HP turbine section) and gas turbine system fuel heating.

During normal higher load operation, emissions are typically controlled in a gas turbine system by two emission control systems. First, as shown in the prior art system of FIG. 1, the exhaust may be passed through CO catalyst system 40 within HRSG 22 to oxidize CO to CO2, as well as oxidizing VOCs. Second, a selective catalytic reduction (SCR) system 42 within HRSG 22 converts NOx to nitrogen and water by causing the exhaust (right dashed line) to react with a reducing agent, e.g., anhydrous ammonia, aqueous ammonia or urea. Systems 40 and 42 may be interspersed within various heat transfer piping sets of HRSG 22. During low load conditions, SCR system 42 and CO catalyst system 40 are not active because they do not attain the desired operating temperature, for example, because they are located after superheater 24 (FIG. 1) or an HP drum (not shown). For example, at startup it can take more than 30 minutes for the traditional systems 40 and 42 to reach sufficient operating temperatures to start reducing NOx and CO emissions. In this case, exhaust (left dashed line) may exit to atmosphere from HRSG 22 without emission control. During this initial period, power plant 10 may continue to emit NOx and CO emissions which are counted against the permit limits for start-up and overall yearly tons limit.

Previous attempts at reducing emissions during start-up have employed one or more emissions converters that can be located immediately after the gas turbine system and upstream of a HRSG directly within the exhaust duct of the gas turbine system. These emission reduction systems may be permanently mounted in the main exhaust path if the gas turbine exhaust temperature is relatively low during all operation conditions or can use a retraction system for selectively moving the emission converter from a first location within an exhaust path within the exhaust duct and a second location outside of the exhaust path outside of the exhaust duct. The emission converters can thus be employed in the first location upstream of the HRSG where sufficient temperatures can be reached to activate the emission converters during start-up or other low load conditions, and can be retracted out of the exhaust path during higher loads at which threshold operation parameters of the power plant can be obtained, such as temperatures capable of activating emissions converters downstream in the HRSG are reached. Additionally, the emission converter upstream of the HRSG can be retracted to avoid undesirable exhaust flow restrictions at the higher load conditions and excessive temperatures that may be detrimental to catalyst useful operating life. As discussed further below, these systems can be difficult to implement and maintain and can result in exhaust gas leakage that can produce emission issues and safety hazards.

Figure 3:
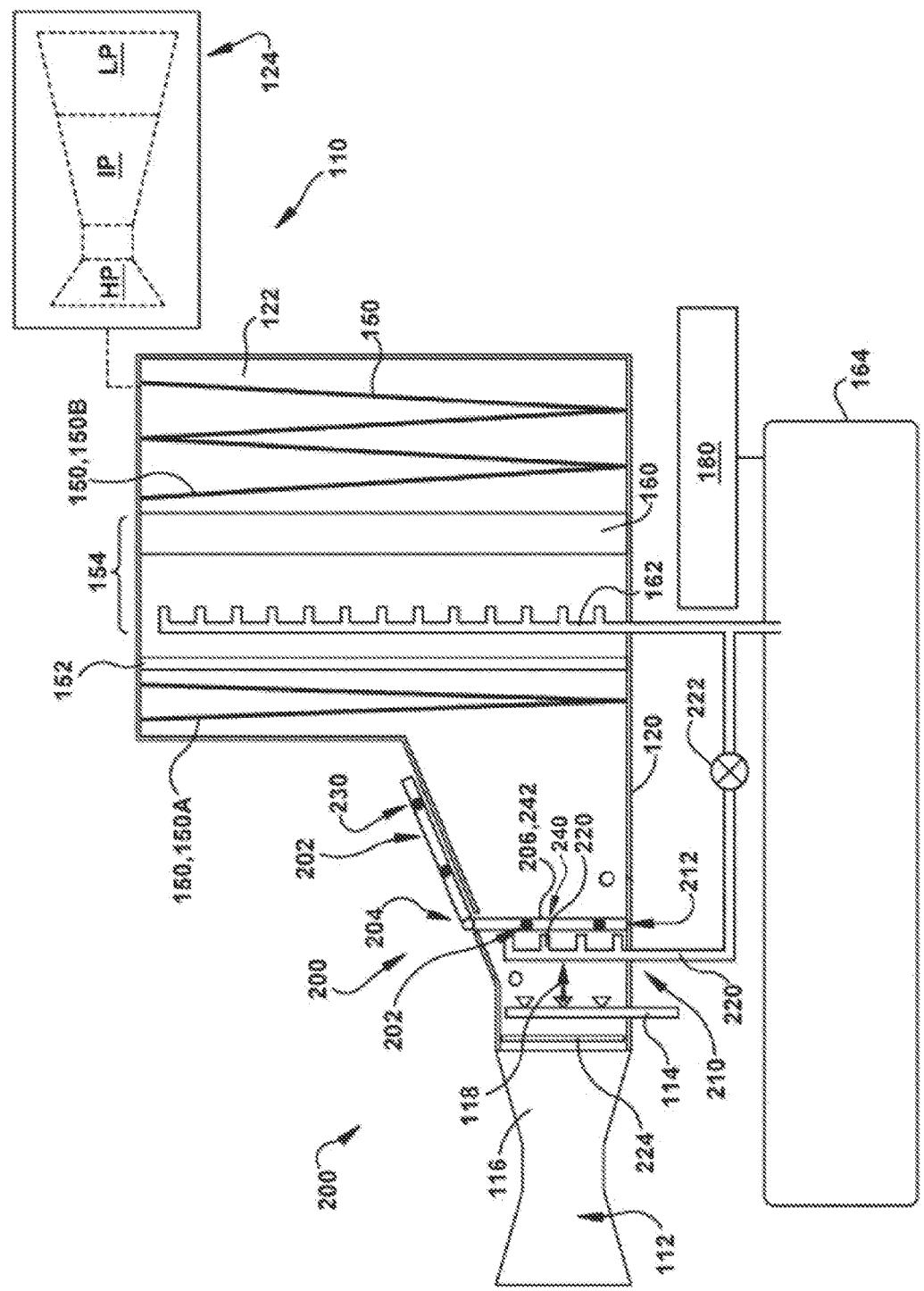
FIG. 3 is a cross-sectional view of a prior art emission reduction system incorporating a moveable start-up emissions converter.

FIG. 3 is a cross-sectional view of combined cycle power plant 110 including gas turbine system 112 operatively coupled to HRSG 122. Gas turbine system 112 can include one or more of any conventional combustion-based gas turbine engines. Gas turbine system 112 can also include conventional duct burner 114 downstream of turbine 116, which can burn any residual fuel in exhaust 118 exiting turbine 116. Exhaust 118 can include a variety of combustion byproducts such as carbon dioxide, carbon monoxide (CO), nitrogen oxide (NOx), Volatile Organic Compounds (VOCs) and the like. Exhaust 118 can pass through exhaust passage 120 operatively coupled to gas turbine 116 and configured to direct exhaust 118 downstream of gas turbine 116, such as to HRSG 122. Exhaust passage 120 can be an integral part of HRSG 122, or can be a separate passage upstream but operatively coupled to HRSG 122. Exhaust passage 120 defines an exhaust path through which exhaust 118 passes.

HRSG 122 can be operably coupled to exhaust passage 120 of gas turbine 116 for generating steam for steam turbine 124, which is shown schematically in phantom in FIG. 3. HRSG 122 can include a steam generating heat exchanger and can include heating pipes 150 through which water and/or steam can be passed to form steam or further heat steam. For example, HRSG 122 can include pipes 150 that can function as conventional parts of an HRSG such as but not limited to: superheater(s), economizer(s) and reheat section(s) for any number of steam turbine stages (i.e., HP, IP and/or LP). Any conventional steam or boiler drums (not shown) can also be provided as part of HRSG 122. HRSG 122 can also include any necessary piping or valving (not shown) to deliver water/steam, as necessary. HRSG 122 can also include bypass systems, valves, and attemperators to operate in fast-start and fast-ramp modes.

HRSG 122 can also include a conventional carbon monoxide (CO) catalyst 152 downstream of a first set of heat exchange pipes 150A. CO catalyst 152 can include a CO catalytic material capable of carrying out the desired catalytic conversion of CO to carbon dioxide (CO2) or other less toxic pollutants in a conventional manner. HRSG 122 can also include a conventional selective catalytic reduction (SCR) system 154. SCR system 154 can convert NOx to nitrogen, water and carbon dioxide by causing the exhaust to react with a reducing agent, e.g., anhydrous ammonia, aqueous ammonia or urea. SCR system 154 can include a conventional SCR 160 and an SCR reducing agent injector 162, such as an ammonia injection grid (AIG), upstream of SCR 160, for example. SCR 160 can include porous catalyst material. HRSG 122 can also have a combined SCR-CO catalyst instead of two separate catalysts. SCR reducing agent injector 162 can include any now known or later developed injector system such as an array of nozzles, sprayers, etc., capable of coating SCR 160 with reducing agent. SCR reducing agent injector 162 can be coupled to any form of reductant delivery system 164 for delivery of an air flow to entrain reducing agent therein. Power plant controller 180 can be employed to control the afore-described components.

FIG. 3 also shows an emission reduction system 200 (hereinafter "ER system 200") for power plant 110. ER system 200 can comprise reductant delivery system 164, emission converter 202, reducing agent injector 220 and one or more panels 240 for power plant 110 according to previous designs.

In one embodiment, emission converter 202 can take the form of SCR 206 of SCR system 210 sized for first location 212 within exhaust passage 120. More specifically, emission converter 202 can include a SCR catalyst medium. For example, SCR 206 can include a metal oxide or zeolite based porous catalyst. First location 212 can be upstream of HRSG 122, and emission converter 202 (such as SCR 206) can span exhaust passage 120 and thus the exhaust path. Emission converter 202 can be smaller than conventional SCR 160 in HRSG 122 due to the size of exhaust passage 120 just downstream of gas turbine 116 compared to HRSG 122. SCR system 210 can also include SCR reducing agent injector 220, which can include an injector system such as an array of nozzles, sprayers, etc., capable of coating SCR 206 with reducing agent. SCR reducing agent injector 220 can be upstream of first location 212 of the exhaust passage. In one embodiment, SCR reducing agent injector 220 can be permanently mounted within exhaust passage 120, e.g., injector 220 can include metal piping and nozzles capable of withstanding the higher load temperatures of gas turbine 116. SCR reducing agent injector 220 can be coupled to any form of reducing agent delivery system. In the example shown, SCR reducing agent injector 220 can be provided as an add-on to reductant delivery system 164. In this case, SCR reducing agent injector 220 can be operatively coupled, e.g., via valves 222 and conduits (not numbered), to reductant delivery system 164. In alternative embodiments, SCR reducing agent injector 220 can be coupled to its own standalone, and smaller, reducing agent delivery system, which would be structured similarly to system 164 without coupling to parts in HRSG 122. Controller 180 can be configured, e.g., via hardware and/or software modifications, to control valve 222 that delivers reducing agent to injector 220. In operation, the reducing agent is injected onto SCR 206, and exhaust 118 passes through the SCR. As exhaust 118 passes through, the NOx reacts with the reducing agent and reduces NOx to nitrogen, water and carbon dioxide, which then may be exhausted to atmosphere or otherwise used for heat recovery in a conventional manner downstream of ER system 200.

ER system 200 can also include flow distributor 224 prior to emission converter 202 to distribute the exhaust flow properly and avoid exhaust flow start-up system, which may be an issue during startup or low load conditions as the flow coming into ER system 200 is approximately 5%-20% of the design flow and the exhaust velocity profile may not be uniform. Flow distributor 224 can include a perforated disc or some other design to distribute the flow properly, e.g., uniformly. Such flow distributor 224 is only shown relative to FIG. 3 for clarity, but can also be part of any ER system arrangement described herein.

In another embodiment, emission converter 202 can take the form of a carbon monoxide (CO) catalyst through which exhaust 118 passes to remove carbon monoxide (CO) from exhaust 118 of gas turbine 116.

Emission converter 202 can take the form of combined SCR/CO catalyst 242. In this embodiment, emission converter 202 can include both SCR layers and CO catalyst layers, and is functional to remove both NOx and CO.

Retraction system 204 can be operably coupled to exhaust passage 120 of gas turbine 116, and can be operable to selectively move emission converter 202 between first location 212 within the exhaust path inside ducting for exhaust passage 120 and second location 230 out of the exhaust path outside ducting for exhaust passage 120. ER system 200 can temporarily position emission converter 202 just downstream of gas turbine 116 exhaust outlet and/or upstream of HRSG 122, for emission reduction at low loads or start-up conditions, and remove the emission converter 202 once operations move to higher loads and/or when the exhaust temperature exceeds the design temperature of emission converter 202.

The present inventors have recognized that problems associated with embodiments of emission reduction system 200 of FIG. 3 can include increased wear and damage of emission converter 202. For example, movement of emission converter 202 between the extended and retracted positions can damage the catalysts due to shaking, bumping and changing of the orientation. Additionally, movement of emission converter 202 can require complicated and expensive motion control devices in order to enable movement in the desired manner, while also attempting to minimize damage of emission converter 202 during movement. Also, moving emission converter 202 in and out of ductwork can compromise the integrity of sealing arrangements on the ductwork. Furthermore, exhaust gas and emissions can leak out of the combined cycle power plant during transition between the extended and retracted positions and, while in each of the inserted or extracted states, which can potentially give rise to safety issues, as hot exhaust gas escaping therefrom can potentially cause burn injuries to operators or low origin/high carbon dioxide locations of the combined cycle power plant. Additionally, injector 220 can be exposed to high temperatures during full load operation of gas turbine 116 due to positioning proximate the first location 212, therefore require expensive materials and components to operate reliably. As such, the present inventors have developed diversion systems for a start-up emission converter (also referred to herein as a "start-up converter") that can, for example, locate the emission converter in a stationary position outside of the main, stationary ductwork for the exhaust passage. Furthermore, in examples, stationary ductwork of the diversion systems can encapsulate the start-up emission converter against the main ductwork for the exhaust passage, thereby sealing the start-up emission converter within the system, but outside the main exhaust passage. Movable flow control or damper elements can be disposed within the diversion systems to alternately route exhaust gas through the start-up emission converter in additional start-up ductwork, or through the main ductwork for the exhaust passage.

Figure 4:
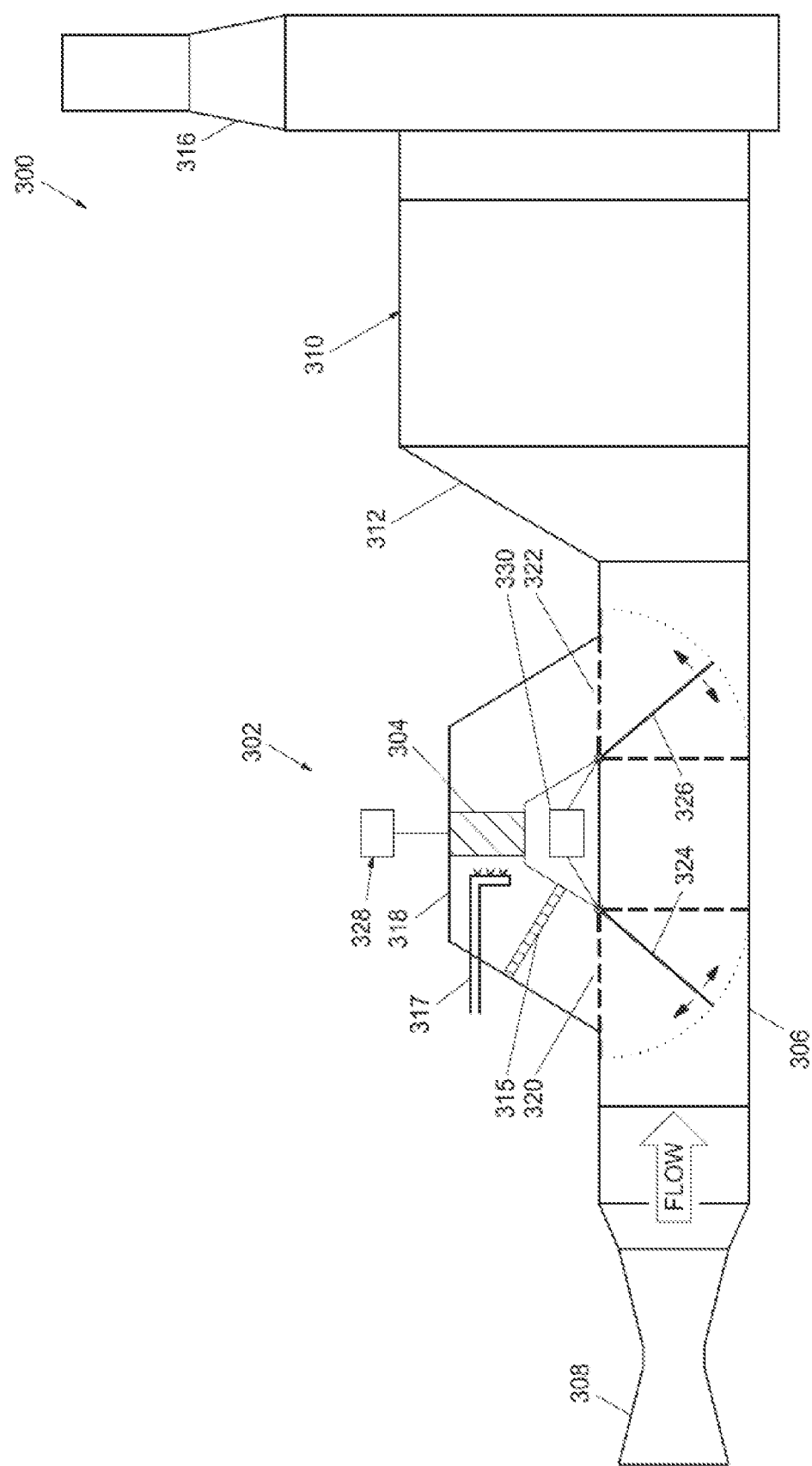
FIG. 4 is a schematic view of a combined cycle power plant incorporating a diversion system for a start-up emissions converter of the present application located on a primary exhaust passage of a gas turbine engine upstream of a HRSG and comprising a start-up duct incorporating pivoting damper panels.

FIG. 4 is a schematic view of combined cycle power plant 300 incorporating diversion system 302 for start-up emission converter 304 of the present application. The diversion system 302 is located on primary exhaust passage 306 of gas turbine engine 308. Exhaust passage 306 can be coupled to heat recovery steam generator (HRSG) 310 by inlet duct 312. HRSG 310 can include exhaust stack 316. Combined cycle power plant 300 can be configured to operate in the same or similar manner and with the same or similar construction as combined cycle power plant 110 of FIG. 3, but with emission reduction system 200 replaced by diversion system 302. For example, HRSG 310 can be constructed similar to HRSG 122 of FIG. 3, and gas turbine engine 308 can be constructed similar to gas turbine system 112 of FIG. 3. Likewise, combined cycle power plant 300 can be configured to operate in conjunction with steam turbine 124 and reductant delivery system 164 of FIG. 3.

Exhaust gas generated by gas turbine engine 308 can be directed sequentially through exhaust passage 306, inlet duct 312, HRSG 310 and exhaust stack 316. Gas turbine engine 308 can be operated to generate rotational shaft power for turning an electrical generator, such as generator 14. The exhaust gas can be directed into exhaust passage 306 where it can be subject to one or more of heating, conditioning or converting before being passed into inlet duct 312 for HRSG 310. HRSG 310 can include various heat exchange components for production and transporting of steam, such as for steam turbine system 16 or steam turbine 124. HRSG 310 can additionally include various components for removing pollutants from the exhaust gas, such as carbon monoxide catalyst 152 and SCR system 154. However, as discussed herein, in order for emissions reductions components to be effective, they must first be heated to a sufficient operating temperature. Due to the thermal mass associated with heat exchange components of HRSG 310 there is some latency in the heating of the emissions reductions components. As such, during start-up of gas turbine engine 308, emissions within the exhaust gas can exceed recommended and government regulated limits.

Diversion system 302 of the present application can selectively route exhaust gas of gas turbine engine 308 through stationary emission converter 304 located upstream of the components of HRSG 310. As such, emission converter 304 can be heated rapidly to operating temperatures to remove emissions from the exhaust gas while the emissions reductions components located within HRSG 310 can be permitted to come to operating temperatures in due course. Once the exhaust gas temperatures of the gas turbine 308 reach a temperature limit of the emission converter 304, or the emissions reductions components within HRSG 310 are brought up to operating temperatures, diversion system 302 of the present application can selectively route exhaust gas of gas turbine engine 308 away from emission converter 304 to avoid any potential for exposure above the optimum operating temperature of emission converter 304 as well as flow losses associated with incorporating structures such as emission converters within the flow of the exhaust gas, for example. Diversion system 302 avoids needing to move converter 304, thereby mitigating damage to converter 304, and removing the need for complex motion control and sealing mechanisms.

In the embodiment of FIG. 4, diversion system 302 can comprise start-up duct 318, inlet 320, outlet 322, inlet damper 324 and outlet damper 326. As described herein, inlet 320 may include a flow distributor to balance any mass distributions of flow into the duct. Duct 318 can define a start-up passage or exhaust path, also herein referred to as a "secondary exhaust path" and functions as a pre-HRSG catalyst duct that is used with exhaust gas before HRSG 310 heats up to operative temperatures to activate emissions control units disclosed therein. It will be appreciated that while duct 318 is contemplated to be utilized to accommodate emission reduction during a start-up phase of turbine 308, the scope of the disclosure is not so limited, and the start-up exhaust path defined by duct 318 may be utilized at any time the exhaust temperature of turbine 308 is below the operating limit of emission converter 304. Duct 318 includes walls configured to receive, contain and route exhaust gas. Duct 318 can be configured to receive all or a portion of the flow of exhaust gas within exhaust passage 306. In an example, duct 318 can be located on the exterior of ductwork for exhaust passage 306 such that duct 318 extends away from and is separate from ductwork for exhaust passage 306. In the illustrated embodiment, duct 318 can be configured to receive all of the exhaust gas within exhaust passage 306. In an example, duct 318 can have a cross-sectional flow area equal to that of exhaust passage 306. However, duct 318 need not have the same cross-sectional flow area as exhaust passage 306 because diversion system 302 can be configured to operate during start-up operations of gas turbine engine 308 at which time the exhaust gas flow is less than the full capacity of exhaust passage 306. In an example, duct 318 can have a cross-sectional flow area approximately 70% of exhaust passage 306.

Ductwork for exhaust passage 306 can include openings to which inlet 320 and outlet 322 of duct 318 can coupled. As such, the interior of duct 318 can be fluidly linked to the interior of the ducting for exhaust passage 306. Both ducting for exhaust passage 306 and duct 318 are stationary such that simple and effective sealing can be provided therebetween.

Emission converter 304 can be positioned within duct 318 to house converter 304 for use during start-up operations of gas turbine engine 308. Converter 304 can be stationary and fixed within duct 318 such that emission converter 304 does not move during operation of diversion system 302, gas turbine engine 308 or combined cycle power plant 300. However, converter 304 can be fixed in a removable manner such that converter 304 can be serviced or replaced. In various embodiments, converter 304 can comprise one or more of a selective catalytic reduction (SCR) system, a CO converter and the like. Converter 304 can comprise a medium or material as appropriate for the types of toxin to be removed, such as one or more of a CO catalyst, an SCR catalyst (to reduce NOx levels) and a multi-pollutant catalyst. Injection grid 317 can be disposed within duct 318 upstream of converter 304. Embodiments in which converter 304 includes an SCR or multi-pollutant catalyst may use injection grid 317 to inject the reductant as described above. Additionally, injection grid 317 may also (or alternatively) inject cooling air into the duct 318 to ensure that a temperature of the converter 304 does not exceed a maximum recommended temperature during those times when the diversion system 302 routes exhaust gas away from the emission converter 304. Disposition of injection grid 317 within duct 318 reduces the need for material and control complexities associated with permanently positioning flow distributer 224 and injector 220 (FIG. 3) within exhaust 118 flow during steady-state, full load operation. Converter 304 can have any requisite thickness for the desired emission reduction being carried out thereby. An additional emission converter 315, such as a CO catalyst system, can be positioned upstream of injection grid 317.

Furthermore, diversion system 302 can be provided with air injection system 328 that can operate outside of the framework of injection grid 317 to selectively introduce cooling or purging air into diversion system 302 at other locations, such as proximate dampers 324 and 326. In various examples, air or gas from an air source can be directed from air injection system 328 into diversion system 302 for various purposes. In various examples, air source 328 can comprise air or gas from the gas turbine engine to which diversion system 302 is connected, such as from a high or low pressure compressor stage of the engine. Additionally, air injection system 328 can use recycled exhaust from cooler sections of the HRSG 310. The air or gas can be directed into duct 318 to seal out high temperature exhaust gas at dampers 324 and 326. The air can be of a temperature that is lower than that of the exhaust gas to both dilute any exhaust gas that leaks into duct 318 and cool the backsides of dampers 324 and 326. Air or gas expended by air injection system 328 can then enter the flow of exhaust gas within the remainder of the system. Any of the embodiments of diversion systems described herein with reference to FIGS. 4-10 can incorporate air injection systems 328, injection grid 317, and additional emission converters 315 as described.

Dampers 324 and 326 can be operated to selectively route exhaust gas flow through either ducting for exhaust passage 306 or duct 318. Dampers 324 and 326 can have lengths, or other dimensions, to completely close off openings (i.e. inlet 320 and outlet 322), respectively. The length of openings 320 and 322 can be correlated to the width of exhaust passage 306 such that dampers 324 and 326 can be sized to both close off openings 320 and 322 and exhaust passage 306. Dampers 324 and 326 can be coupled to duct 318 via suitable pivoting mechanisms, such as hinges. Dampers 324 and 326 can be operatively coupled to actuator 330 to move between closed positions, with dampers 324, 326 in FIG. 4 horizontally oriented and open positions with dampers 324 326 in FIG. 4 vertically oriented. In various examples, actuator 330 can comprise any suitable means for moving or rotating dampers 324 and 326. For example, actuator 330 can comprise a hydraulic cylinder having a piston rod coupled to actuation arms connected to dampers 324 and 326. In another example, actuator 330 can comprise a motor and a chain, and actuator 330 and dampers 324 and 326 can include sprockets such that the chain can be pulled by actuator 330 to rotate dampers 324 and 326 within exhaust passage 306. In another example, actuator 330 can comprise a motor and a jack screw rotated by the motor, and dampers 324 and 326 can comprise a threaded member, such as a nut, to engage the jack screw. Such actuation mechanisms can be incorporated into any embodiment of diversion systems described herein.

The closed position indicates that duct 318 is closed to exhaust gas flow, while in the open position exhaust gas can flow through duct 318. Dampers 324 and 326 can be located completely within duct 318 and ducting of exhaust passage 306 such that operation of dampers 324 and 326 does not produce an opening within sealed ductwork from which exhaust gas can escape. For example, only a single simple through-bore for one or two actuators for damper elements 324 and 326 can be included in the ductwork. In other examples, damper elements 324 and 326 can be included inside the ductwork such that no openings are produced in the ductwork for the actuators.

In other examples, only a single damper can be used. For example, only inlet damper 324 can be used to close off and open flow into duct 318. In such a case, outlet 322 can be provided with a baffle or screen to prevent back flow or migration of exhaust flow into duct 318 through outlet 322 when inlet damper 324 is closed, as is described in greater detail below.

Figure 5:
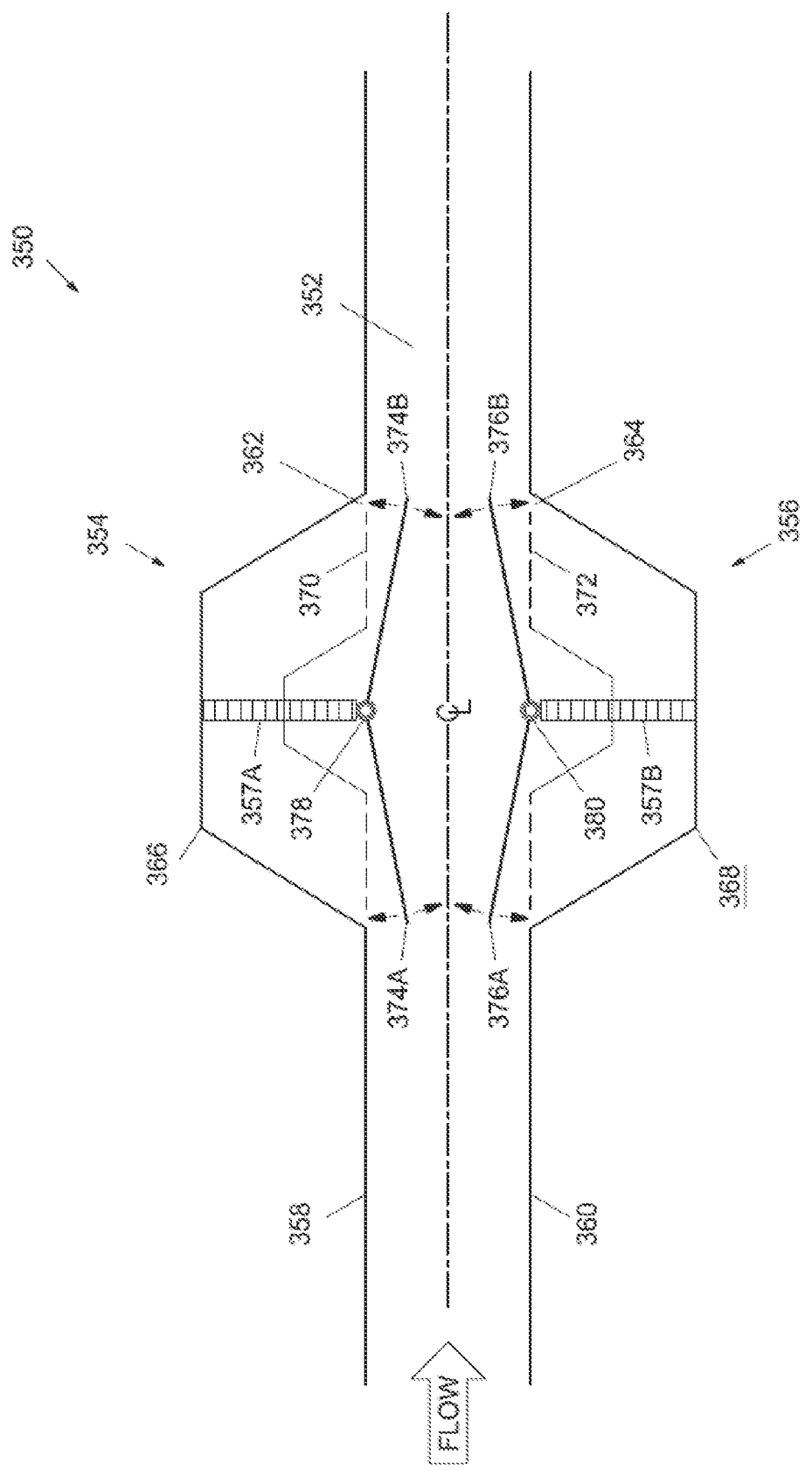
FIG. 5 is a schematic view of another embodiment of a diversion system for a primary exhaust passage of a gas turbine engine comprising two opposing start-up passages incorporating dampers and screens.

FIG. 5 is a schematic view of diversion system 350 for primary exhaust passage 352 of a gas turbine engine comprising two parallel start up passages, one start-up passage 354 and a second start-up passage 356 in which first emission converter 357A and second emission converter 357B can be positioned. First start-up passage 354 and second start-up passage 356 can be located on opposite sides, such as upper and lower sides or left and right sides, of duct centerline CL. Diversion system 350 can be incorporated into combined cycle power plant 300 of FIG. 4 in lieu of diversion system 302.

Exhaust passage 352 can include two start-up ducts, first duct wall 358 and second duct wall 360. First duct wall 358 can include opening 362 for the first start-up duct passage and second duct wall 360 can include opening 364 for the second start-up duct passage. First start-up passage 354 can include duct wall 366 and second start-up passage 356 can include second duct wall 368. Diversion system 350 can further comprise first screen 370, second screen 372, first dampers 374A and 374B and second dampers 376A and 376B. Dampers 374A-376B can be coupled within exhaust passage 352 via pivot points 378 and 380.

In the embodiment of FIG. 5, duct walls 366 and 368 can be coupled to duct walls 358 and 360, respectively, to form extensions thereof or bulges therein. The extensions or bulges form space to retain converters 357A and 357B in a stationary manner. As such, converters 357A and 357B can remain within the walls of exhaust passage 352 where adequate sealing can be achieved.

Dampers 374A-376B can operate similarly to dampers 324 and 326 of FIG. 4 to alternatively seal-off start-up passages 354 and 356 while opening exhaust passage 352 when dampers 374A-376B are closed and open start-up passages 354 and 356 while closing a section of exhaust passage 352 when dampers 374A-376B are open, such as by rotating at pivot points 378 and 380. Thus, dampers 374A-376B can be sized to have lengths that are approximately equal to one half of openings 362 and 364 and one half of the height of exhaust passage 352.

Screens 370 and 372 can be positioned across openings 362 and 364, respectively, to prevent undesirable flow of exhaust gas into passages 354 and 356. For example, diversion system 350 can include different combinations of screens 370 and 372 and dampers 374A-376B. In an embodiment, diversion system 350 can include only dampers 374A and 376A and screens 370 and 372. Thus, dampers 374A and 376A can be rotated to extended positions to meet or overlap at centerline CL thereby blocking or obstructing exhaust passage 352 and forcing exhaust gas to flow into start-up passages 354 and 356. The exhaust gas can flow through screens 370 and 372 because that is the only route provided through the system in that configuration. When dampers 374A and 376A are rotated to retracted positions against or in-line with walls 358 and 360, respectively, exhaust gas flows through exhaust passage 352 and, due to pressure differentials and other flow conditions, screens 370 and 372 can be sufficient to prevent backflow of the exhaust gas into start-up passages 354 and 356 into openings 362 and 364. In embodiments, only half of screens 370 and 372 can be included to cover portions of openings 362 and 364 not coverable by one of dampers 374A and 376A. Screens 370 and 372 can comprise sheets or panels of material having perforations, slots, holes or the like to allow attenuated flow or air and gas therethrough. The proportion of the cross-sectional area of screens 370 and 372 that are open to flow can be selected based on desired design and performance characteristics.

Figure 6:
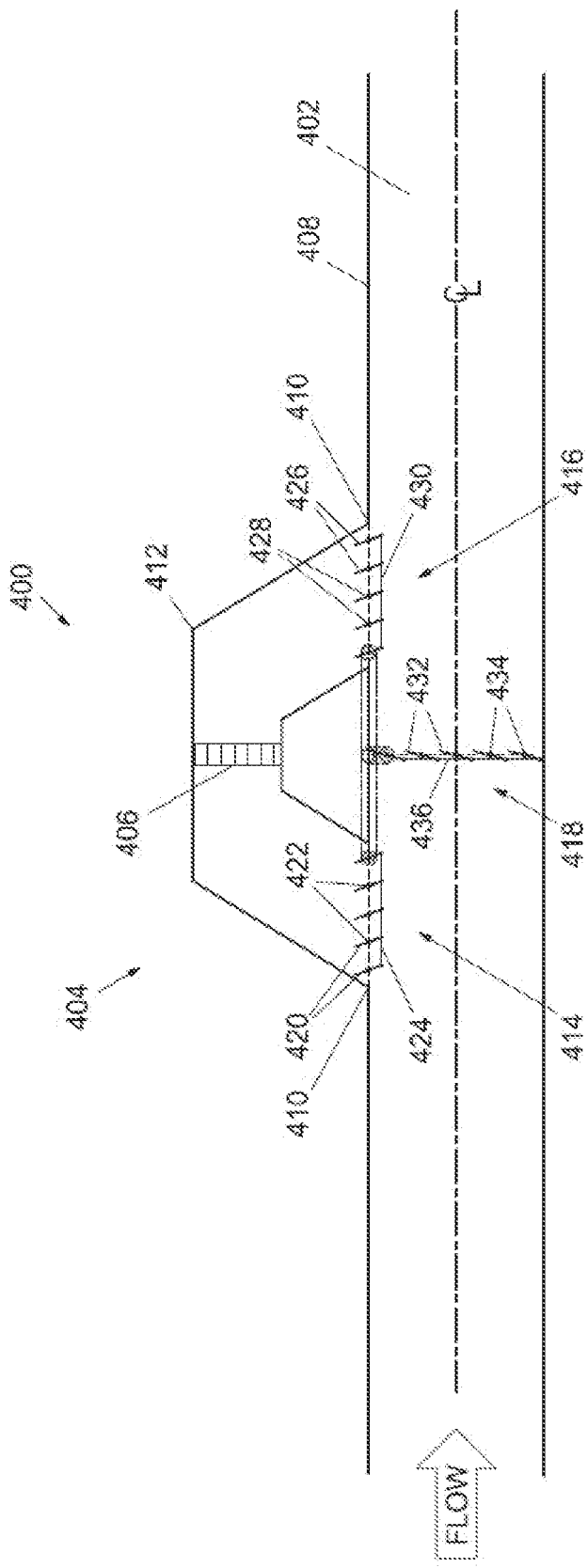
FIG. 6 is a schematic view of another embodiment of a diversion system for a primary exhaust passage of a gas turbine engine comprising a start-up passage incorporating movable louvers.

FIG. 6 is a schematic view of diversion system 400 for primary exhaust passage 402 of a gas turbine engine comprising start-up passage 404 in which first emission converter 406 can be positioned. Start-up passage 404 can be located above duct centerline CL. A second lower exhaust passage (not shown) having a second emission converter (not shown) can be included on the opposite side of centerline CL on exhaust passage 402. Diversion system 400 can be incorporated into combined cycle power plant 300 of FIG. 4 in lieu of diversion system 302.

Exhaust passage 402 can include upper duct wall 408. Duct wall 408 can include opening 410. Start-up passage 404 can comprise duct wall 412. Diversion system 400 can further comprise inlet louvers 414, outlet louvers 416 and start-up louvers 418. Louvers 414-418 can comprise movable vanes coupled within exhaust passage 402 via spindles or axles. For example, louvers 414 can comprise vanes 420 that are mounted to spindles 422. Vanes 420 can be coupled by connecting rod 424, which can be coupled to an actuating mechanism (not shown) such as a screw, chain drive or hydraulic cylinder. The actuating mechanism can be operated to pull and push connecting rod 424 to rotate vanes 420 on spindles 422. In an open position, vanes 420 can be rotated such that their surfaces are arranged substantially transverse to centerline CL (as illustrated in FIG. 6) to permit exhaust gas to flow into opening 410 between vanes 420. In a closed position, vanes 420 can be rotated such that their surfaces are arranged substantially parallel to centerline CL to prevent exhaust gas from flowing into opening 410.

Louvers 416 can comprise vanes 426 that are mounted to spindles 428 and that can be coupled by connecting rod 430. Louvers 418 can comprise vanes 432 that are mounted to spindles 434 and that can be coupled by connecting rod 436. Louvers 416 and 418 can be operated similarly as louvers 414.

During normal or steady-state operations of the gas turbine engine, diversion system 400 can be operated such that louvers 414 and 416 are rotated to a closed state to remove emission converter 406 from the flow of exhaust gas, while louvers 418 can be rotated to an open state to route the exhaust gas through exhaust passage 402. Louvers 418 can be aerodynamically shaped such that in the open state disturbance (and any resulting pressure loss therefrom) of exhaust gas between vanes 432 is minimized. During start-up operations of the gas turbine engine, diversion system 400 can be operated such that louvers 414 and 416 are rotated to an opened state to include emission converter 406 in the flow of exhaust gas, while louvers 418 can be rotated to a closed state to block exhaust gas from flowing through exhaust passage 402 and force the exhaust gas through louvers 414 into start-up passage 404. In various embodiments, louvers 416 can be replaced by a screen as described herein.

Figure 7A:
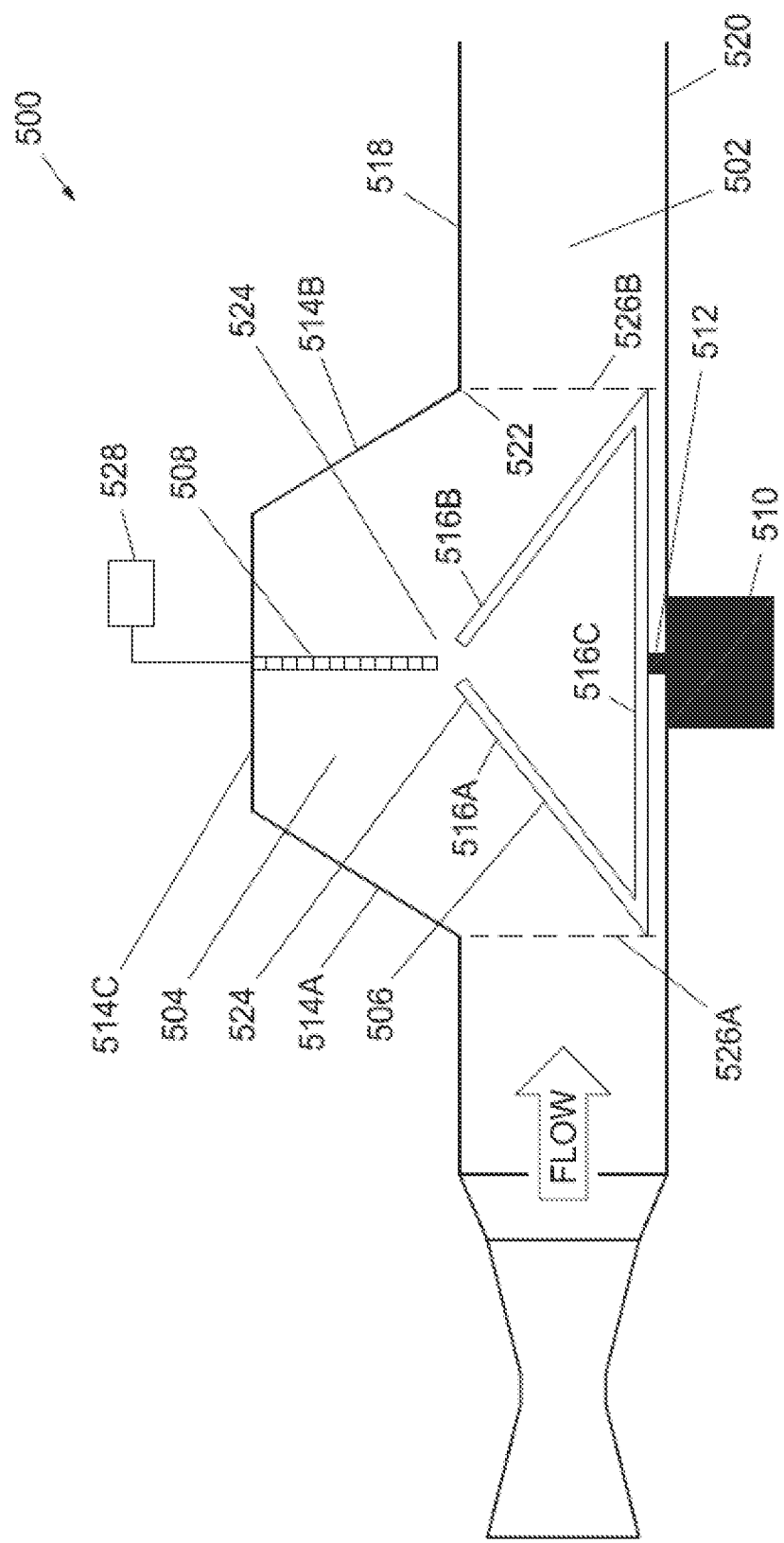
FIG. 7A is a schematic view of another embodiment of a diversion system for a primary exhaust passage of a gas turbine engine comprising a start-up passage incorporating a movable emission converter shield in an extended position to block the primary exhaust passage and direct exhaust gas across an emission converter.
Figure 7B:
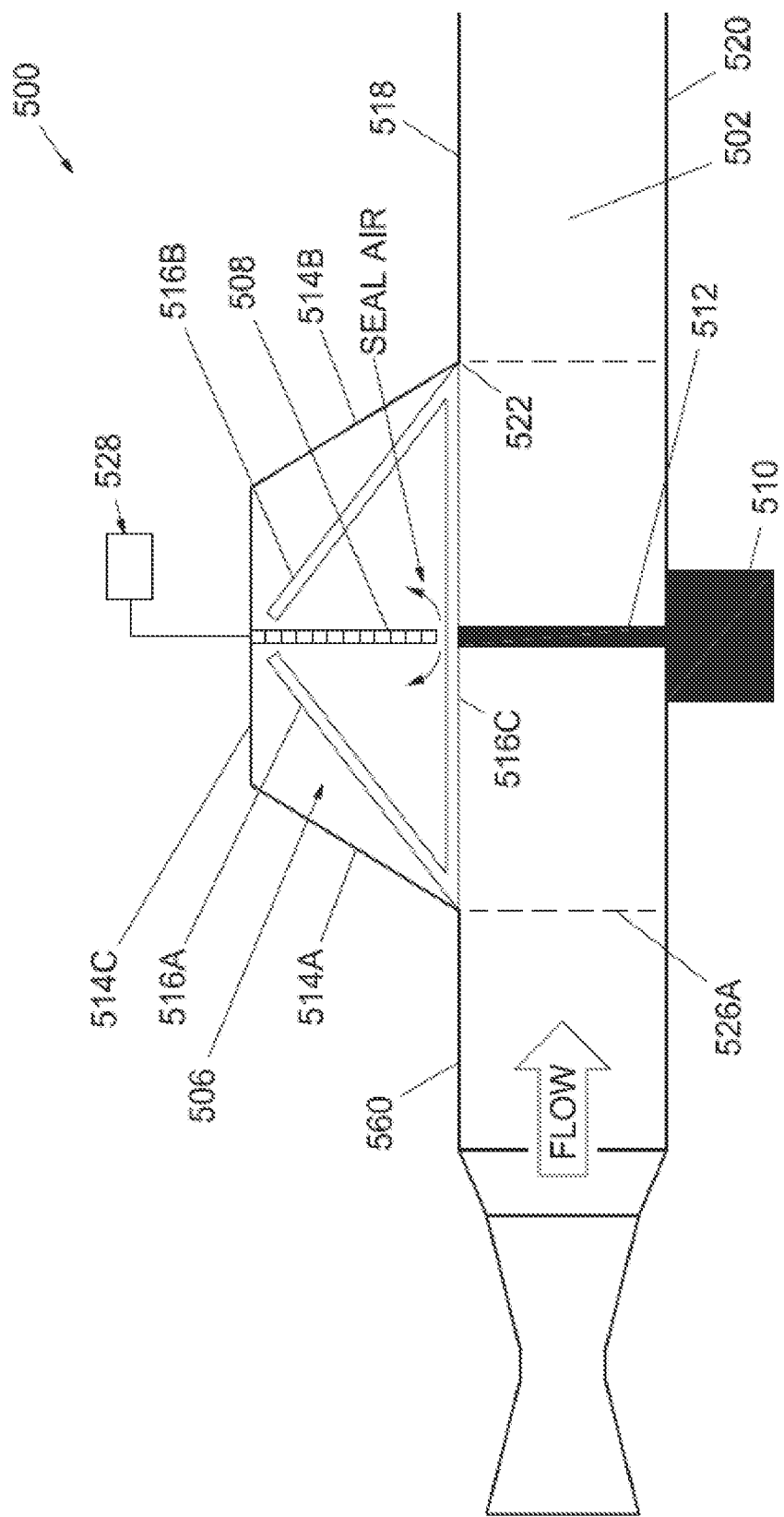
FIG. 7B is a schematic view of the diversion system of FIG. 7A showing the movable converter shield in a retracted position to cover the emission converter and open the primary exhaust passage.

FIG. 7A is a schematic view of diversion system 500 for primary exhaust passage 502 of a gas turbine engine comprising start-up passage 504 incorporating movable emission converter shield 506 in an extended position to block exhaust passage 502 and direct exhaust gas across emission converter 508. FIG. 7B is a schematic view of diversion system 500 of FIG. 7A showing movable emission converter shield 506 in a retracted position to cover emission converter 508 and open exhaust passage 502. FIGS. 7A and 7B are discussed concurrently. Diversion system 500 can be incorporated into combined cycle power plant 300 of FIG. 4 in lieu of diversion system 302.

Diversion system 500 can comprise actuator 510 having extension 512. Start-up passage 504 can comprise panels 514A, 514B and 514C. Movable emission converter shield 506 can comprise panels 516A, 516B and 516C. Start-up passage 504 and moveable emission converter shield 506 can be configured to have corresponding shapes such that moveable emission converter shield 506 can be stowed within start-up passage 504. However, start-up passage 504 and moveable emission converter shield 506 need not have the same shape.

Exhaust passage 502 can include outer panel 518 and inner panel 520. Outer panel 518 can include opening 522 to which start-up passage 504 can be attached. In particular, panels 514A and 514B can extend from inner panel 520 at or near opening 522. At opening 522, panels 514A and 514B can be separated by a distance that is approximately equal to the width of panel 516C. However, panel 516C can be slightly larger than opening 522 to completely cover opening 522 or can be slightly smaller than opening 522 to accommodate the use of additional sealing bodies. Panels 516A and 516B can extend from panel 516C and can be spaced apart to leave opening 524 to accept emission converter 508. As such, moveable emission converter shield 506 can form a sheath for partially encapsulating emission converter 508 in the retracted position.

In an open configuration, as shown in FIG. 7A, moveable emission converter shield 506 can be extended out of start-up passage 504 and retracted toward actuator 510 via extension 512. Actuator 510 and extension 512 can be configured to raise and lower moveable emission converter shield 506 into and out of start-up passage 504. Moveable emission converter shield 506 can be configured to slide or roll on tracks 526A and 526B disposed within exhaust passage 502 extending generally vertically between outer panel 518 and inner panel 520. Actuator 510 and extension 512 can be positioned outside of exhaust passage 502 so as to not directly engage exhaust gas. Moveable emission converter shield 506 can include extensions (not shown) that extend, for example, into and out of the plane of FIGS. 8A and 8B to engage with extension 512. Such extensions can be readily sealed through the use of known sealing devices, such as brush seals, sealing flanges and the like. In other embodiments, actuator 510 and extension 512 can be incorporated within exhaust passage 502 to facilitate sealing. In embodiments, actuator 510 can be located below panel 514C such that extension 512 can be protected from the flow of exhaust gas, such as by being incorporated within or behind moveable emission converter shield 506.

In various examples, actuator 510 can comprise any suitable means for moving or translating moveable emission converter shield 506. For example, actuator 510 can comprise a barrel of a hydraulic cylinder and extension 512 can comprise a piston rod of the hydraulic cylinder that couples to moveable emission converter shield 506. In another example, actuator 510 can comprise a motor and extension 512 can comprise a chain, and actuator 510 and moveable emission converter shield 506 can include sprockets such that the chain can be pulled by actuator 510 to lift moveable emission converter shield 506 out of start-up passage 504. In another example, actuator 510 can comprise a motor and extension 512 can comprise a jack screw rotated by the motor, and moveable emission converter shield 506 can comprise a threaded member, such as a nut, to engage the jack screw.

In an example, panel 516C can be pulled up against outer panel 518 of exhaust passage 502 to prevent exhaust gas from passing therebetween. Panels 516A and 516B can be shaped to direct exhaust gas downward into start-up passage 504. In an example, opening 524 between panels 516A and 516B can be configured to engage emission converter 508, such as with the use of sealing members, to prevent exhaust gas from passing into the interior of moveable emission converter shield 506. Additionally, emission converter 508 can include or can be coupled to a frame including tracks that can slidingly engage panels 516A and 516B at opening 524.

In various examples, a sealing air system can direct air or gas from air source 528 into diversion system 500 for various purposes. In various examples, air source 528 can comprise air or gas from the gas turbine engine to which diversion system 500 is connected, such as from a high or low pressure compressor stage of the engine. In examples, air source 528 can use recycled exhaust from the cooler sections of the HRSG. The air or gas can be directed into start-up passage 504 with moveable emission converter shield 506 retracted therein (as shown in FIG. 7B) to seal out high temperature exhaust gas. The air can be of a temperature that is lower than that of the exhaust gas to both dilute any exhaust gas that leaks into start-up passage 504 and cool the underside of panel 516C. Any of the embodiments of diversion systems described herein with reference to FIGS. 4-10 can incorporate sealing air or gas systems as described. Air or gas expended by air source 528 can then enter the flow of exhaust gas within the remainder of the system.

Figure 8A:
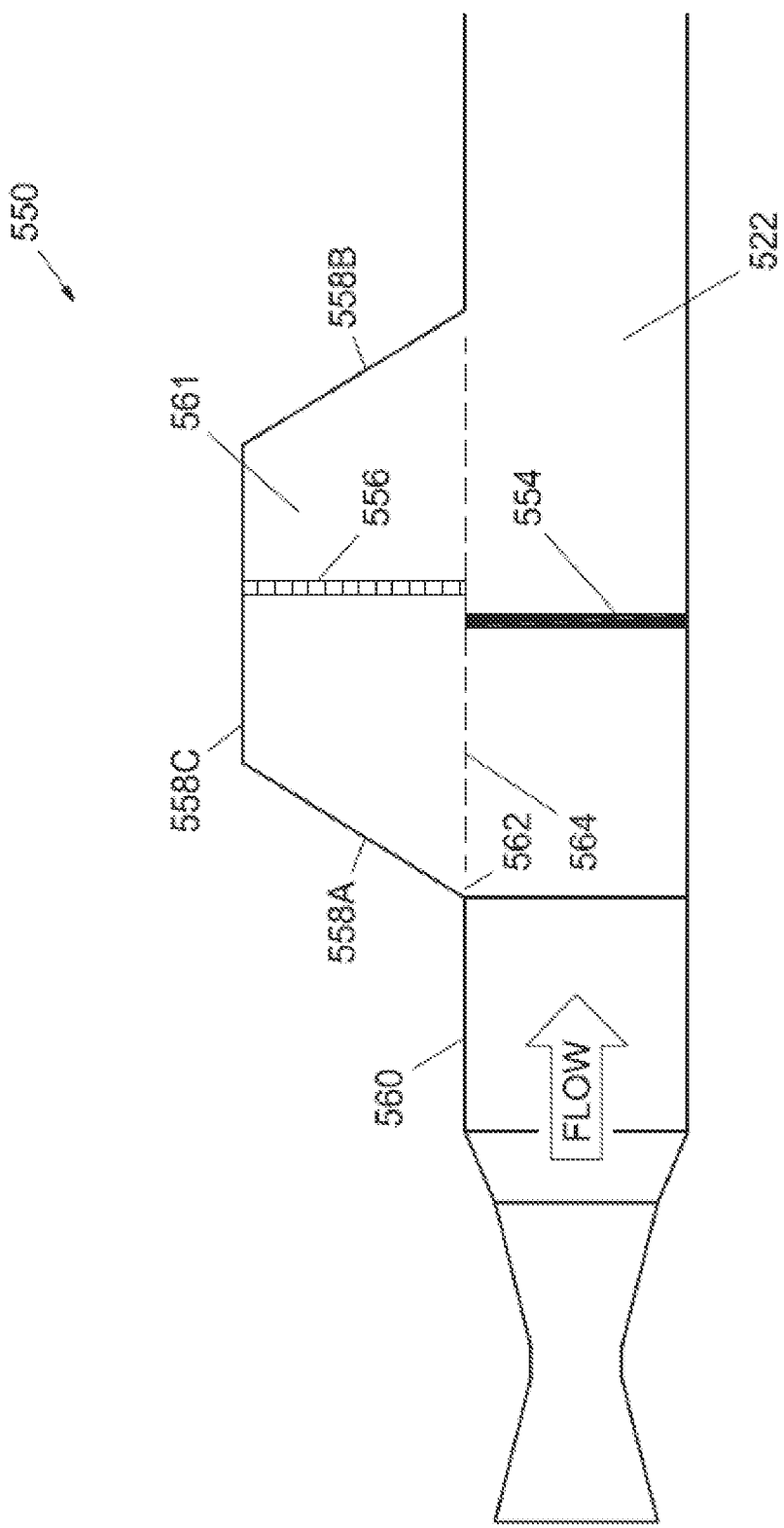
FIG. 8A is a schematic view of another embodiment of a diversion system for a primary exhaust passage of a gas turbine engine comprising a blocker door in an extended position to block the primary exhaust passage and direct exhaust gas across the emission converter.
Figure 8B:
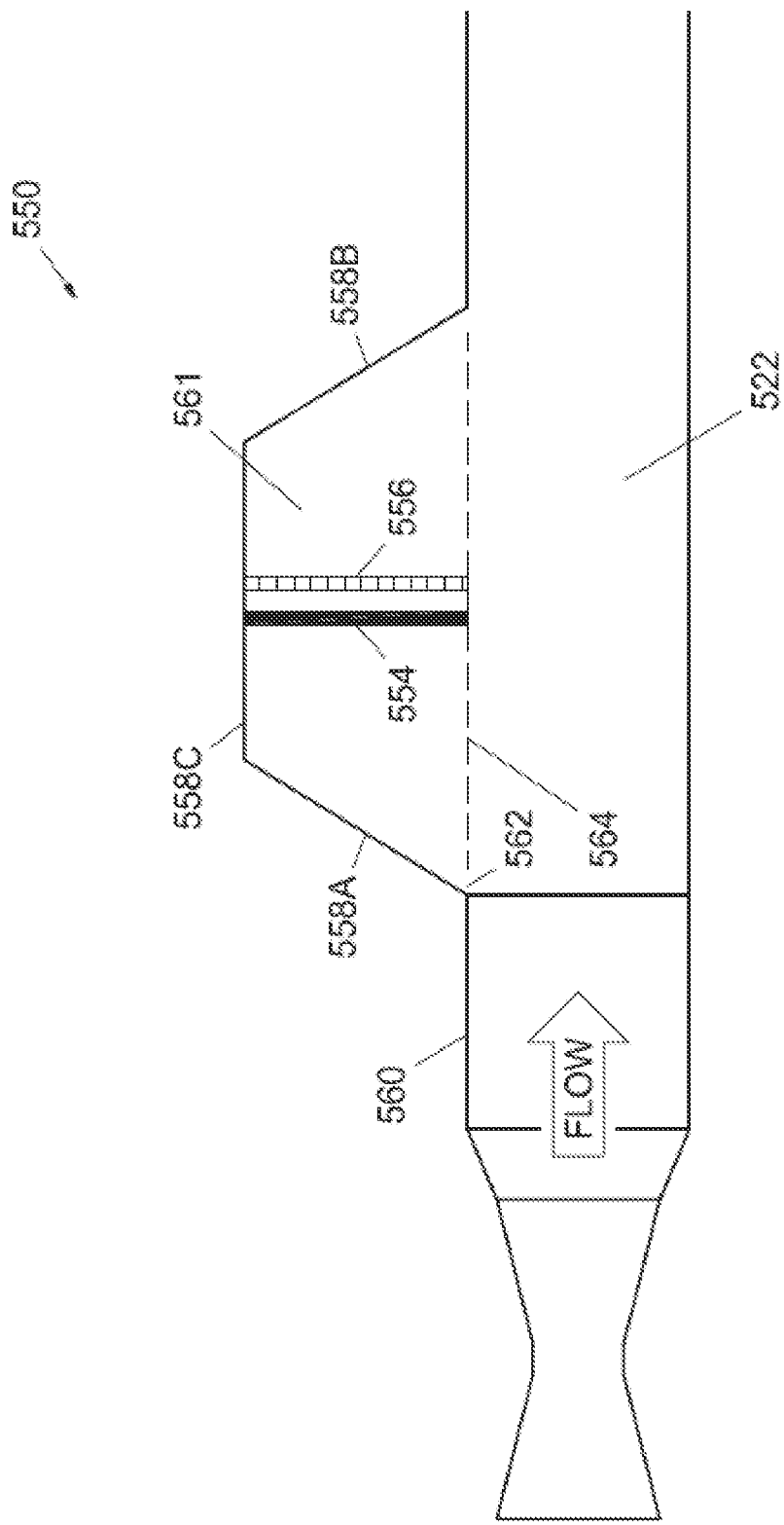
FIG. 8B is a schematic view of the diversion system of FIG. 8A showing the blocking door in a retracted position to obstruct the emission converter and open the primary exhaust passage.

FIG. 8A is a schematic view of diversion system 550 for primary exhaust passage 552 of a gas turbine engine comprising blocker door 554 in an extended position to block exhaust passage 552 and direct exhaust gas across emission converter 556. FIG. 8B is a schematic view of diversion system 550 of FIG. 8A showing blocking door 554 in a retracted position to obstruct emission converter 556 and open exhaust passage 552. FIGS. 8A and 8B are discussed concurrently. Diversion system 550 can be incorporated into combined cycle power plant 300 of FIG. 4 in lieu of diversion system 302.

Diversion system 550 can include panels 558A, 558B and 558C that can be coupled to outer panel 560 of exhaust passage 552 to form duct 561. Screen 564 can be placed across opening 562 in outer panel 560 and can include openings, holes or perforations to permit flow of air or gas through opening 562. Blocker door 554 can be coupled to an actuation system (not shown) to translate blocker door 554 between the closed position of FIG. 9A and the open position of FIG. 9B.

Diversion system 550 can be configured to operate in a similar manner as other diversion systems described herein. For example, diversion system 550 can incorporate start-up duct 561 similar to that of diversion system 350 of FIG. 5, but can include a moveable door or damper similar to diversion system 500 of FIGS. 7A and 7B. However, in the embodiment of FIGS. 8A and 8B, blocker door 554 can comprise a simple, generally flat panel that can be extended into exhaust passage 522 from duct 561 through an opening in screen 564. With blocker door 554 in an extended position, exhaust gas traveling through exhaust passage 522 can be deflected upward into duct 561 through screen 564. Screen 564 can have sufficiently large openings to not significantly impede the flow of exhaust gas, especially at start-up conditions where the exhaust gas volume and velocity is low compared to steady state of full load operating conditions. The exhaust gas can thereafter flow through emission converter 556 and then the remainder of duct 561 before returning to exhaust passage 552. With blocker door 554 in a retracted position, exhaust gas entering exhaust passage 552 can continue unimpeded by blocker door 554 throughout the length of exhaust passage 552. Screen 564 can be configured to prevent backflow or other egress of exhaust gas into duct 561 as is described herein.

Figure 9A:
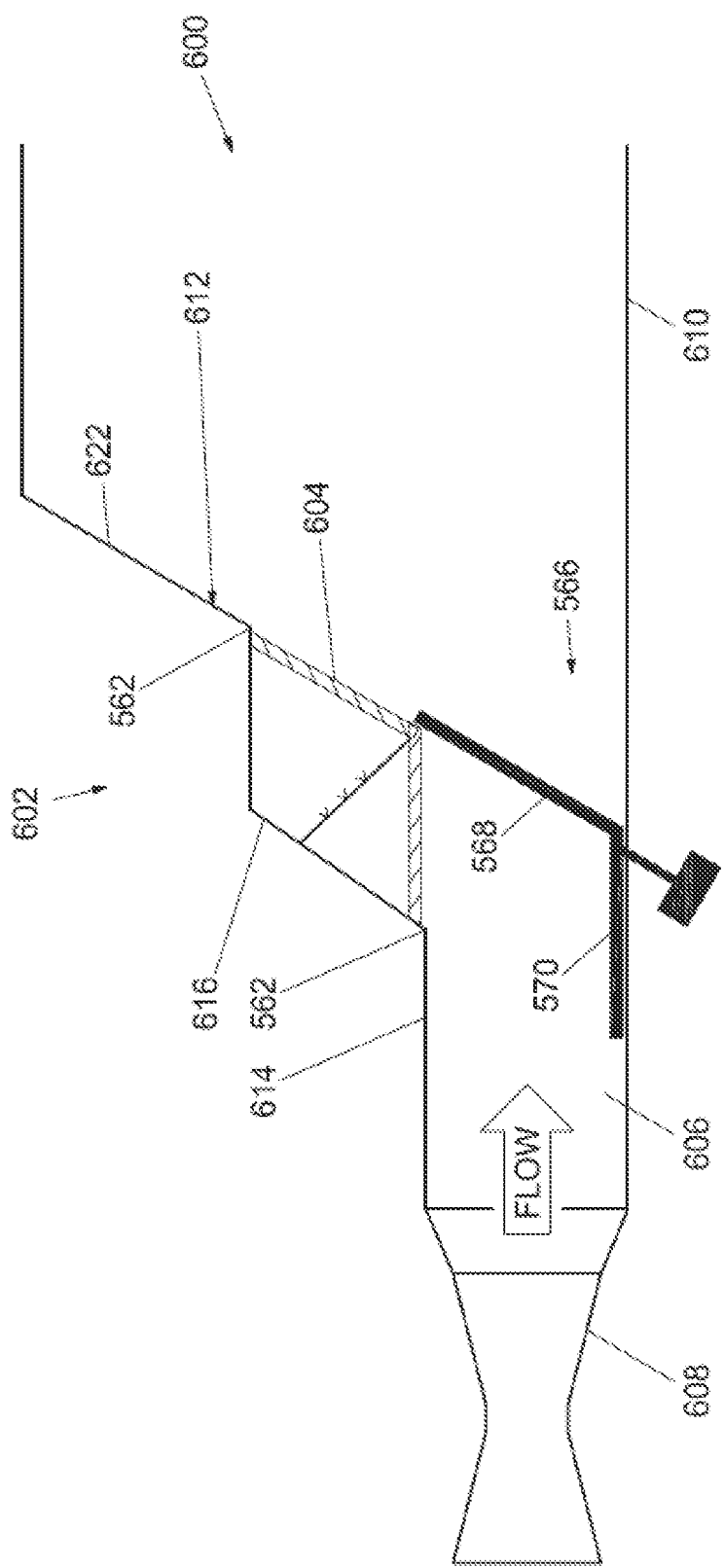
FIG. 9A is a schematic view of a combined cycle power plant incorporating a diversion system for a start-up emission converter of the present application comprising dampers and screens in an open state located in an inlet duct of a heat recovery steam generator.
Figure 9B:
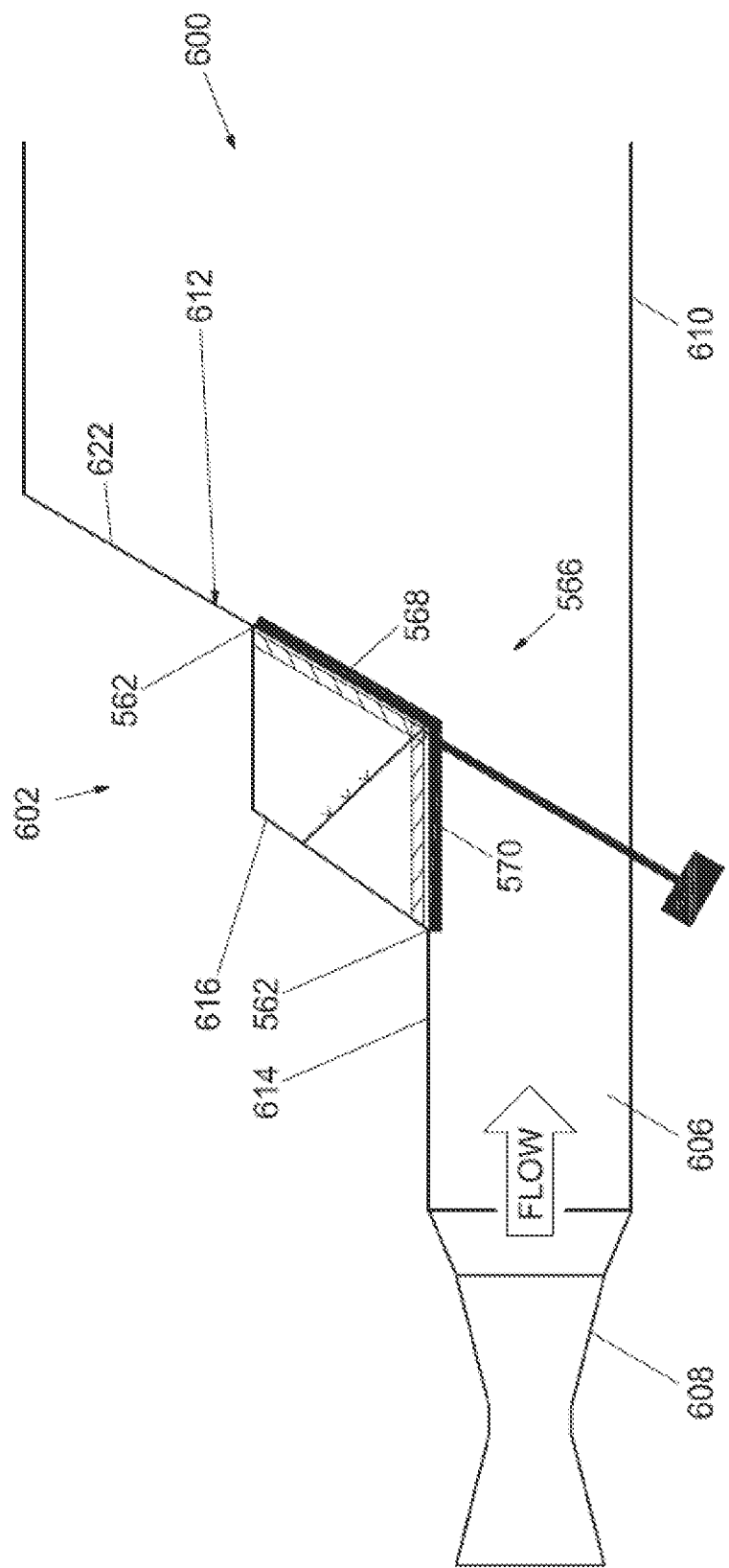
FIG. 9B is a schematic view of a combined cycle power plant of FIG. 9B showing the diversion system with the dampers and screens in a closed state.

FIG. 9A is a schematic view of combined cycle power plant 600 incorporating diversion system 602 for start-up emission converter 604 in an open state. FIG. 9B is a schematic view of diversion system 600 of FIG. 9B in a closed state. FIGS. 9A and 9B are discussed concurrently. Combined cycle power plant 600 can be configured similar to combined cycle power plant 300 of FIG. 4.

Diversion system 602 can be located on primary exhaust passage 606 downstream of the gas turbine engine 608 and before the heat recovery steam generator (HRSG) 610. In particular, diversion system 602 can be located on inlet duct 612 of HRSG 610 adjacent duct 614 for exhaust passage 606. Diversion system 602 can include blocker start-up duct 616 and backward L-shaped blocker door 566, which can include vertical panel 568 and horizontal panel 570. Though described as "vertical" and "horizontal" panels 568 and 570 need not extend exactly in such orientations are intended only as general descriptions.

In the embodiment of FIGS. 9A and 9B, emission converter 604 can be incorporated into combined cycle power plant 600 at inlet duct 612 to take advantage of space and structure provided by diverging panel 622. Inlet duct 612 increases in size relative to exhaust passage 606 to accommodate the components of HRSG 610. The upwardly extending component of panel 622 can provide structural support for diversion system 602. Likewise, the space between panel 622 and duct 614 of exhaust passage 606 provides a location for conveniently locating a diversion system. Diversion system 602 can be configured according to any of the embodiments described herein.

Vertical panel 568 can function similar to that of blocker door 554 of FIGS. 8A and 8B and can be used to seal opening 562 extending between exhaust passage 606 and start-up duct 616 at diverging panel 622. Horizontal panel 570 can extend from vertical panel 568 to extend across the portion of opening 562 extending between vertical panel 568 and start-up duct 616 at duct 614. As such, in the retracted position of FIG. 9B, backward L-shaped blocker door 566 can fully shield converter 604 from exhaust gas within exhaust passage 606. In the extended position, backward L-shaped blocker door 566 can positioned such that horizontal panel 570 contacts the lower duct wall of passage 606 and vertical panel 568 extends across passage 606 to divert exhaust gas into start-up duct 616.

Figure 10:
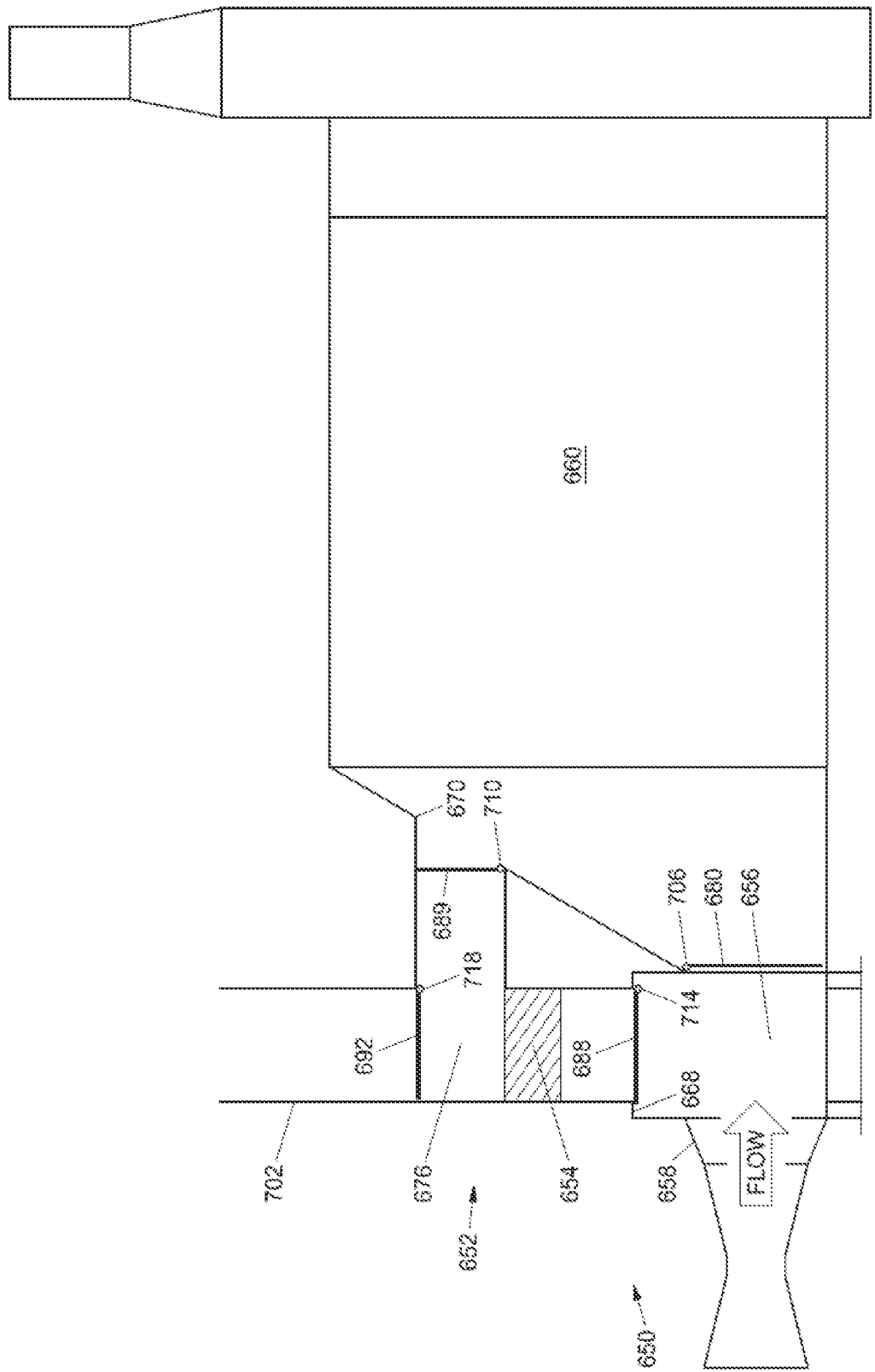
FIG. 10 is a side view schematic of another embodiment of a diversion system for a primary exhaust passage of a gas turbine engine.

FIG. 10 depicts a side schematic view of combined cycle power plant 650 incorporating diversion system 652 including start-up emission converter 654. Combined cycle power plant 650 can be configured similar to combined cycle power plant 300 of FIG. 4. The configuration depicted in FIG. 10 may be particularly well suited to retrofitting diversion system 652 to an existing combined cycle power plant.

Diversion system 652 can be added to and located on top of primary exhaust passage 656 downstream of the gas turbine engine 658 and upstream of the heat recovery steam generator (HRSG) 660. In particular, a first opening 668 and second opening 670 can be provided within the top of the primary exhaust passage 656 and a transition zone (which is generally diverging and oriented at an oblique angle to the exhaust gas flow path) of the inlet duct 662 of HRSG 660, respectively. Coupling the diversion system 652 at the first opening and second opening 668, 670 is contemplated to be particularly advantageous for subsequent, retrofit installation on existing combined cycle power plants because it does not substantially increase a size of the plan (top) view footprint of the combined cycle power plant.

Diversion system 602 can include start-up duct 676 and dampers 680, 688, 689. An additional damper 692 is operative to allow the exhaust gas to be diverted through a bypass stack 702 directly to the atmosphere, allowing the gas turbine 658 to operate in simple cycle mode if so desired. If bypass stack 702 is included and the gas turbine 658 is expected to operate in simple cycle and full-load mode, emission converter 654 may need to be selected to withstand additional operating temperatures. Dampers 680-692 may include pivots, such as at 706-718, may include retractable "garage-door" type panels, or any other type of appropriate panel. As discussed herein, some dampers may be replaced with screens, depending upon the final operational configuration.

It will be appreciated that while some embodiments depicted and described herein have symmetrically disposed upper and lower start-up passages, the scope of the disclosure is not so limited, and will include other configurations, such as a single start-up passage sized accordingly for start-up exhaust gas flow volume, for example.

It will be appreciated that while an injection grid (e.g., injection grid 317) has been depicted and described in conjunction with less than all of the embodiments herein, its use may be applicable with any of the embodiments to cool the stationary emissions converter while hot exhaust gasses are routed around the stationary emissions converter through the remainder of the exhaust duct. Additionally, use of the injection grid 317 may be applicable to inject reductant with any of the embodiments described herein that have an emissions converter including at least one of an SCR and a multi-pollutant converter.

The systems and methods discussed in the present application can be useful in safely, feasibly and inexpensively reducing start-up emissions in combined cycle power plants without sacrificing performance at high and full load operating conditions. The diversion systems described herein can take advantage of the mechanical simplicity of sealing a stationary emission converter within ductwork of an exhaust system of a gas turbine engine. As such, the emission converter does not need to be moved and is not subject to wear and damage associated with repeated movement. Furthermore, actuation mechanisms to move damper elements between retracted and extended positions can be simplified compared to alternative designs. For example, it is simple and easy to seal a movable damper door or body that is already contained within sealed ductwork than to seal a moving emission converter that must pass through duct walls. Furthermore, a single emission converter body can be incorporated in the present design, without the need for complicated mechanisms for coupling together multiple pivoting emission converter bodies.

VARIOUS NOTES & EXAMPLES

Example 1 can include or use subject matter such as an emission reduction system for a combined cycle power plant including a gas turbine and heat recovery steam generator (HRSG) can comprise a stationary emission converter in fluid communication with and disposed upstream of the HRSG; and a diversion system operably coupled to an exhaust passage of the gas turbine, the exhaust passage defining an exhaust path for exhaust gas of the gas turbine through the heat recovery steam generator, the diversion system operable to define a primary exhaust path excluding the stationary emission converter and a start-up exhaust path including the stationary emission converter.

Example 2 can include, or can optionally be combined with the subject matter of Example 1, to optionally include a diversion system comprising a flow control element configured to control exhaust flow between the primary exhaust path and the start-up exhaust path.

Example 3 can include, or can optionally be combined with the subject matter of one or any combination of Examples 1 or 2 to optionally include a diversion system that further comprises: a start-up duct attached to the exhaust passage to define the start-up exhaust path; a primary duct for the gas turbine defining the exhaust passage and the primary exhaust path; and the flow control element is located within the diversion system to alternately move between a first position extending at least partially across the start-up exhaust path and a second position extending at least partially across the primary exhaust path.

Example 4 can include, or can optionally be combined with the subject matter of one or any combination of Examples 1 through 3 to optionally include a flow control element that is configured to rotate or translate between the first and second positions.

Example 5 can include, or can optionally be combined with the subject matter of one or any combination of Examples 1 through 4 to optionally include a flow control element comprising a pair of rotating blocker doors located at an inlet and an outlet of the start-up duct.

Example 6 can include, or can optionally be combined with the subject matter of one or any combination of Examples 1 through 5 to optionally include a flow control element comprising a pair of rotating blocker doors located on opposing walls of the primary duct, each rotating blocker door extending across approximately half of the exhaust passage.

Example 7 can include, or can optionally be combined with the subject matter of one or any combination of Examples 1 through 6 to optionally include a flow control element comprising a pair of translating blocker doors located at an inlet and an outlet of the start-up duct.

Example 8 can include, or can optionally be combined with the subject matter of one or any combination of Examples 1 through 7 to optionally include a flow control element comprising a pair of translating blocker doors located on opposing walls of the primary duct, each translating blocker door extending across approximately half of the exhaust passage.

Example 9 can include, or can optionally be combined with the subject matter of one or any combination of Examples 1 through 8 to optionally include a flow control element comprising two pairs of rotating or translating blocker doors.

Example 10 can include, or can optionally be combined with the subject matter of one or any combination of Examples 1 through 9 to optionally include a second start-up duct attached to the primary duct and a second stationary emission converter located in the second start-up duct.

Example 11 can include, or can optionally be combined with the subject matter of one or any combination of Examples 1 through 10 to optionally include a flow control element comprising a translating, backward L-shaped damper door.

Example 12 can include, or can optionally be combined with the subject matter of one or any combination of Examples 1 through 11 to optionally include a flow control element comprising a translating sheath configured to at least partially bound the stationary emission converter in the second position.

Example 13 can include, or can optionally be combined with the subject matter of one or any combination of Examples 1 through 12 to optionally include a translating sheath comprising a thee sided door having a first panel that can define a boundary for the primary duct and second and third panels extending from the first panel that can define a boundary for the start-up duct.

Example 14 can include, or can optionally be combined with the subject matter of one or any combination of Examples 1 through 13 to optionally include a primary duct that includes a first cross-sectional area and the start-up duct that includes a second cross-sectional area, wherein the second cross-sectional area is less than the first cross-sectional area.

Example 15 can include, or can optionally be combined with the subject matter of one or any combination of Examples 1 through 14 to optionally include a start-up duct having a second cross-sectional area that is approximately 70% of a first cross-sectional area of the primary duct.

Example 15 can include, or can optionally be combined with the subject matter of one or any combination of Examples 1 through 14 to optionally include a screen extending across the start-up duct to inhibit exhaust gas flow into the start-up duct.

Example 16 can include, or can optionally be combined with the subject matter of one or any combination of Examples 1 through 15 to optionally include a screen extending across an exit of the start-up duct.

Example 17 can include, or can optionally be combined with the subject matter of one or any combination of Examples 1 through 16 to optionally include a second screen extending across an inlet of the start-up duct.

Example 18 can include, or can optionally be combined with the subject matter of one or any combination of Examples 1 through 17 to optionally include a fluid injection system configured to introduce a fluid to interact with the emission converter.

Example 19 can include, or can optionally be combined with the subject matter of one or any combination of Examples 1 through 18 to optionally include a fluid injection system configured to introduce a reducing agent upstream of the stationary emission converter.

Example 20 can include, or can optionally be combined with the subject matter of one or any combination of Examples 1 through 19 to optionally include ae fluid injection system configured to introduce cooling air proximate the stationary emission converter.

Example 21 can include, or can optionally be combined with the subject matter of one or any combination of Examples 1 through 20 to optionally include a fluid injection system configured to receive cooling air from the gas turbine.

Example 22 can include, or can optionally be combined with the subject matter of one or any combination of Examples 1 through 21 to optionally include a flow control element comprising a louver system.

Example 23 can include, or can optionally be combined with the subject matter of one or any combination of Examples 1 through 22 to optionally include a flow control element comprising a first louver extending across the primary duct, and second and third louvers extending across an inlet and an outlet of the start-up duct, respectively.

Example 24 can include, or can optionally be combined with the subject matter of one or any combination of Examples 1 through 23 to optionally include louvers comprising a plurality of individually rotatable panels that can be rotated to redirect exhaust gas flow in a first position or to permit exhaust gas flow between the individually rotatable panels.

Example 25 can include, or can optionally be combined with the subject matter of one or any combination of Examples 1 through 24 to optionally include a diversion system operably coupled to an inlet duct of the HRSG that extends at an oblique angle to the flow path for exhaust gas of the gas turbine.

Example 26 can include, or can optionally be combined with the subject matter of one or any combination of Examples 1 through 25 to optionally include an actuator coupled to the flow control element within the primary exhaust path to move the damper element between the first position and the second position.

Example 27 can include, or can optionally be combined with the subject matter of one or any combination of Examples 1 through 26 to optionally include an actuator comprising a hydraulic cylinder, a chain drive or a jack screw.

Example 28 can include, or can optionally be combined with the subject matter of one or any combination of Examples 1 through 27 to optionally include a bypass stack located downstream of the gas turbine and upstream of the HRSG, wherein the diversion system is coupled to the bypass stack.

Example 29 can include, or can optionally be combined with the subject matter of one or any combination of Examples 1 through 28 to optionally include a diversion system located on a bypass stack comprising a first blocker door configured to alternatively block exhaust gas flow between the primary duct and the HRSG, a second blocker door configured to alternatively block exhaust gas flow between the primary duct and the bypass stack, a third blocker door configured to alternatively block exhaust gas flow between the start-up duct and the HRSG; and a fourth blocker door configured to alternatively block exhaust gas flow between the start-up duct and the bypass stack.

Example 30 can include or use subject matter such as a method for controlling emissions during low load conditions of a gas turbine engine used in a combined cycle power plant comprising starting the gas turbine engine that generates an exhaust gas flow; directing the exhaust gas flow of the gas turbine engine through a primary passage of an exhaust duct coupled to a heat recovery steam generator (HRSG); actuating a flow control element to close-off exhaust gas flow through the primary passage and route exhaust gas flow into a start-up passage of a start-up duct; directing the exhaust gas flow in the start-up passage through an emission converter located in the start-up duct; attaining a threshold operation parameter of the combined cycle power plant; and actuating the flow control element to close-off exhaust gas flow through the start-up passage and route exhaust gas flow into the primary passage.

Example 31 can include, or can optionally be combined with the subject matter of Example 30, to optionally include an operation parameter comprising attaining an effective operating temperature at an emission converter within the HRSG.

Example 32 can include, or can optionally be combined with the subject matter of one or any combination of Examples 30 or 31 to optionally include actuating the flow control element comprising at least one of: pivoting a damper door between alternate positions; translating a backward L-shaped panel between retracted and deployed positions; and translating a sheath between retraced and deployed positions.

Example 33 can include, or can optionally be combined with the subject matter of one or any combination of Examples 30 through 32 to optionally include inhibiting backflow of a portion of the exhaust gas flow into the start-up passage of the start-up duct using a screen.

Example 34 can include or use subject matter such as an emission reduction system for a power plant comprising a gas turbine and a heat recovery steam generator (HRSG) comprising an exhaust duct for fluidly coupling the gas turbine and HRSG, the exhaust duct defining a primary exhaust passage; a diversion system coupled to the exhaust duct, the diversion system comprising: a start-up duct defining a start-up passage bypassing a portion of the primary exhaust passage, and a flow control element operatively coupled to the start-up duct to move between a first position and a second position; and a stationary emission converter disposed within the start-up duct; wherein the flow control element is configured to maintain exhaust gas flow through the primary exhaust passage and prevent exhaust gas flow through the start-up passage in a first position and divert exhaust gas flow from the primary exhaust passage through the start-up passage in a second position.

Example 35 can include, or can optionally be combined with the subject matter of Example 34, to optionally include a sealing air system configured to direct air into the start-up passage to preserve a temperature limit of the stationary emission converter.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. An emission reduction system for a combined cycle power plant, the emission reduction system comprising:
   an exhaust duct in fluid communication with a heat recovery steam generator (HRSG) and configured to communicate exhaust gas from a gas turbine to the HRSG, the exhaust duct defining an exhaust passage extending along a flow axis between an inlet and an outlet;
   a first bypass opening, downstream of the inlet, at a first location in an exterior wall of the exhaust duct to allow exhaust gas to exit the exhaust duct oblique to the flow axis;
   a first start-up duct connected to the exterior wall of the exhaust duct to receive exhaust gas from the exhaust duct via the first bypass opening and extending from the first bypass opening to a second bypass opening upstream of the HRSG, at a second location in the exterior wall of the exhaust duct, to allow exhaust gas to flow from the first start-up duct back into the exhaust duct;
   a first stationary emission converter disposed in the start-up duct; and
   a diversion system coupled to the exhaust duct, the diversion system comprising:
      a first movable door configured to selectively block the first bypass opening or guide exhaust gas from the exhaust duct into the first start-up duct.

2. The emission reduction system of claim 1, wherein the first movable door is a first pivoting door configured to rotate from a first position flush with the exterior panel of the exhaust duct to cover the first bypass opening within the exhaust duct to a second position extending into the exhaust passage toward the flow axis of the exhaust passage.

3. The emission reduction system of claim 2, wherein the diversion system further comprises:
a second pivoting door connected to the exhaust duct at the second bypass opening.

4. The emission reduction system of claim 2, wherein the first pivoting door is configured to be parallel to the flow axis in the first position.

5. The emission reduction system of claim 3, further comprising:
a third bypass opening and a fourth bypass opening in the exhaust duct;
a second start-up duct connected to the exhaust duct to extend between the third and fourth bypass openings;
a second stationary emission converter positioned within the second start-up duct between the third and fourth bypass openings; and
a third pivoting door and a fourth pivoting door configured to selectively block the third and fourth bypass openings, respectively;
wherein the third and fourth bypass openings are located on the exhaust duct opposite the first and second bypass openings.

6. The emission reduction system of claim 1, wherein the exhaust duct includes a first cross-sectional area and the start-up duct includes a second cross-sectional area, wherein the second cross-sectional area is less than the first cross-sectional area.

7. The emission reduction system of claim 1, further comprising a screen extending across the first bypass opening to inhibit exhaust gas flow into the start-up duct.

8. The emission reduction system of claim 1, further comprising a fluid injection system configured to introduce a fluid to interact with the first stationary emission converter, wherein the fluid injection system is configured to introduce one or both of a reducing agent upstream of the first stationary emission converter and cooling air proximate the first stationary emission converter.

9. The emission reduction system of claim 3, wherein the first stationary emission converter is positioned axially between the first and second bypass openings.

10. The emission reduction system of claim 1, wherein the HRSG comprises a second stationary emissions converter.

11. The emission reduction system of claim 3, wherein the first start-up duct comprises an inner wall extending between the first bypass opening and the second bypass opening.

12. An emission reduction system for a power plant comprising a gas turbine and a heat recovery steam generator (HRSG), the emission reduction system comprising:
an exhaust duct configured to fluidly couple to the gas turbine at an upstream portion of the exhaust duct and an inlet of the HRSG at a downstream portion of the exhaust duct, the exhaust duct defining a primary exhaust passage;
a first diversion system coupled to the exhaust duct, the first diversion system comprising:
a start-up duct defining a U-shaped start-up passage bypassing a central portion of the exhaust duct between the upstream portion and the downstream portion; and
a flow control element comprising a movable door operatively coupled to the exhaust duct to move between a first position and a second position; and
a stationary emission converter disposed within the start-up duct alongside the central portion of the exhaust duct;
wherein the U-shaped start-up passage comprises:
a first leg extending from the exhaust duct upstream of the stationary emission converter to remove exhaust gas from the exhaust duct;
a second leg extending to the exhaust duct downstream of the stationary emission converter to return exhaust gas to the exhaust duct; and
a middle leg connecting the first leg and second leg;
wherein the movable door is configured to maintain exhaust gas flow through the primary exhaust passage and prevent exhaust gas flow through the U-shaped start-up passage in the first position and divert exhaust gas flow from the primary exhaust passage through the U-shaped start-up passage in the second position; and
wherein the movable door comprises:
a first portion comprising:
a first end pivotably coupled to the exhaust duct at a pivot point; and
a second end facing upstream in the exhaust duct; and
a second portion comprising:
a first end pivotably coupled to the exhaust duct at the pivot point; and
a second end facing downstream in the exhaust duct.

13. The emission reduction system of claim 12, further comprising a sealing air system configured to direct air into the U-shaped start-up passage to preserve a temperature limit of the stationary emission converter.

14. The emission reduction system of claim 12, wherein the stationary emission converter is positioned in the middle leg of the U-shaped start-up passage.

15. The emission reduction system of claim 12, further comprising:
a second stationary emission converter positioned outside of the exhaust duct; and
a second diversion system coupled to the exhaust duct to selectively control flow of exhaust gas flow from the exhaust duct through the second stationary emission converter.

16. A combined cycle power plant comprising:
a gas turbine engine configured to generate exhaust gas;
a heat recovery steam generator (HRSG);
an exhaust duct extending from the gas turbine engine to the HRSG to convey the exhaust gas from the gas turbine engine to the HRSG, the exhaust duct comprising:
an inlet end portion connected to the gas turbine engine;
an outlet end portion connected to the HRSG; and
a middle portion connecting the inlet end portion and the outlet end portion;
a first bypass opening in the middle portion proximate the inlet end portion of the exhaust duct to allow exhaust gas to exit the exhaust duct oblique to the flow axis;
a second bypass opening in the middle portion proximate the outlet end portion of the exhaust duct to allow exhaust gas to access the exhaust duct oblique to the flow axis; and
a diversion system coupled to the exhaust duct, the diversion system comprising:
a start-up duct defining a U-shaped passage that bypasses a portion of the exhaust duct, the start-up duct extending from the first bypass opening to the second bypass opening to extract exhaust gas from and return exhaust gas to the exhaust duct upstream of the HRSG;

a first stationary emission converter positioned in the start-up duct between the first and second bypass openings; and a flow control panel system configured to alternatively flow exhaust gas through the exhaust duct or the start-up duct, the flow control panel system comprising a first pivoting door configured to selectively block the first bypass opening and a second pivoting door configured to selectively block the second bypass opening; and a second stationary emission converter positioned within the HRSG.

17. The combined cycle power plant of claim 16, wherein:

the first pivoting door and the second pivoting door are configured to be positioned parallel to the central axis to block flow through the start-up duct; and the start-up duct comprises a multi-legged duct connecting the first and second bypass openings in the exhaust duct.

18. The combined cycle power plant of claim 16, wherein the first pivoting door is connected to the middle portion of the exhaust duct at a first pivot joint between the first bypass opening and the second bypass opening and configured to open toward the gas turbine engine; and the second pivoting door is connected to the middle portion of the exhaust duct at a second pivot joint between the first bypass opening and the second bypass opening and configured to open toward the HRSG.

19. The combined cycle power plant of claim 16, further comprising:

a third stationary emission converter positioned outside of the exhaust duct; and a second diversion system coupled to the exhaust duct to selectively control flow of exhaust gas from the exhaust duct through the third stationary emission converter.

20. The combined cycle power plant of claim 16, wherein the second stationary emission converter is positioned axially between upstream and downstream heat exchange pipes of the HRSG upstream of an exhaust stack of the HRSG.

\* \* \* \* \*